United States Patent
Mistry et al.

[11] Patent Number: 5,902,498
[45] Date of Patent: May 11, 1999

[54] METHODS OF JOINING METAL COMPONENTS AND RESULTING ARTICLES PARTICULARLY AUTOMOTIVE TORQUE CONVERTER ASSEMBLIES

[75] Inventors: Pravin Mistry, Shelby Township; Shengzhong Liu, Canton; Manuel C. Turchan, Northville, all of Mich.

[73] Assignee: QQC, Inc., Dearborn, Mich.

[21] Appl. No.: 08/822,829

[22] Filed: Mar. 24, 1997

Related U.S. Application Data

[63] Continuation of application No. 08/366,782, Dec. 30, 1994, abandoned, which is a continuation-in-part of application No. 08/297,986, Aug. 30, 1994, abandoned, which is a continuation-in-part of application No. 08/296,550, Aug. 25, 1994, abandoned.

[51] Int. Cl.$^6$ .................. B23K 26/10; B23K 23/00
[52] U.S. Cl. .................. 219/121.64; 29/889.21; 228/234.3
[58] Field of Search .................. 219/121.14, 121.63, 219/121.64, 121.84, 121.85, 137 R; 228/182, 234.3, 246, 247, 245; 148/524, 525, 24; 29/889.21, 889.22, 889.5; 416/213 R, 213 A, 197 C

[56] References Cited

U.S. PATENT DOCUMENTS

| | | | |
|---|---|---|---|
| 934,711 | 9/1909 | Chapman | 228/234.3 |
| 2,115,895 | 5/1938 | Weihmann | 29/889.5 |
| 2,282,175 | 5/1942 | Emerson | 219/137 R |
| 2,304,721 | 12/1942 | Werther | 416/197 C |
| 3,240,153 | 3/1966 | Schrader | 29/889.21 |
| 3,271,852 | 9/1966 | Long | 228/234.3 |
| 3,873,237 | 3/1975 | Tokunaga | 416/197 C |
| 3,890,168 | 6/1975 | Shumway | 148/24 |
| 3,986,239 | 10/1976 | Worner | 416/213 R |
| 4,634,832 | 1/1987 | Martyr | 219/121.64 |
| 4,835,357 | 5/1989 | Schalk | 219/121.64 |
| 4,868,365 | 9/1989 | Farone et al. | 219/121.64 |
| 5,188,678 | 2/1993 | Sekhar et al. | 148/514 |

FOREIGN PATENT DOCUMENTS

| | | |
|---|---|---|
| 57-56195 | 4/1982 | Japan . |
| 61-209791 | 9/1986 | Japan . |
| 62-21479 | 1/1987 | Japan . |
| 1-172279 | 7/1989 | Japan . |
| 4-162974 | 6/1992 | Japan . |

*Primary Examiner*—Gregory Mills
*Attorney, Agent, or Firm*—Harness, Dickey & Pierce, P.L.C.

[57] ABSTRACT

Thermal stresses normally associated with joining are alleviated by a low temperature joining technique of the present invention. A low-temperature joining material is applied (as a paste, or as a powder spray, or as a tape, or as a paint, or as a putty) at the junction of two components desired to be joined together. Energy from a source such as a laser beam (for example an Nd:YAG or a $CO_2$ laser) or by a flame, arc, plasma, or the like, is either "walked" along the joining material to react the entire amount of joining material, or the joining material is self-sustaining and simply requires igniting a selected portion of the joining material by the energy source. In an exemplary application of the process, vanes are brazed to the bowl and/or to the shroud of an automatic transmission bowl (impeller or turbine) assembly, preferably using the low-temperature joining material. Systems for delivering the joining material and the energy are described. The fabrication of hollow vanes is described. The fabrication of shroudless bowl components and stator components subsuming the function of the shroud are described.

37 Claims, 7 Drawing Sheets

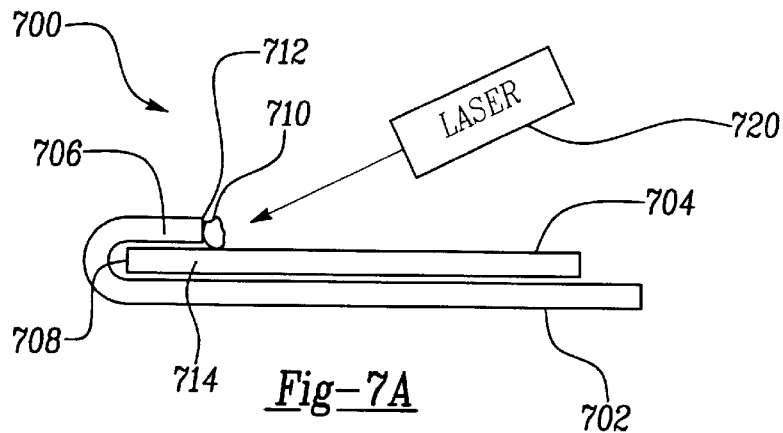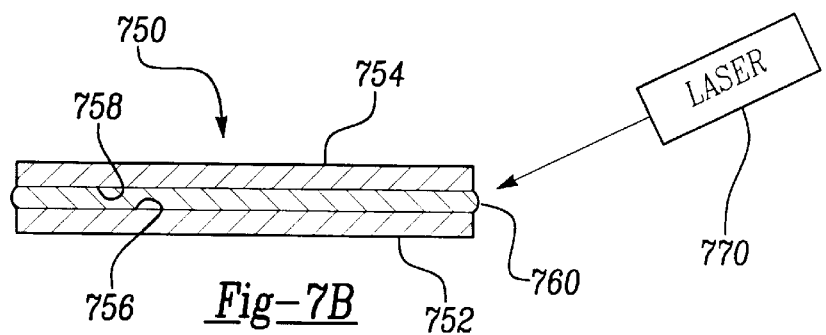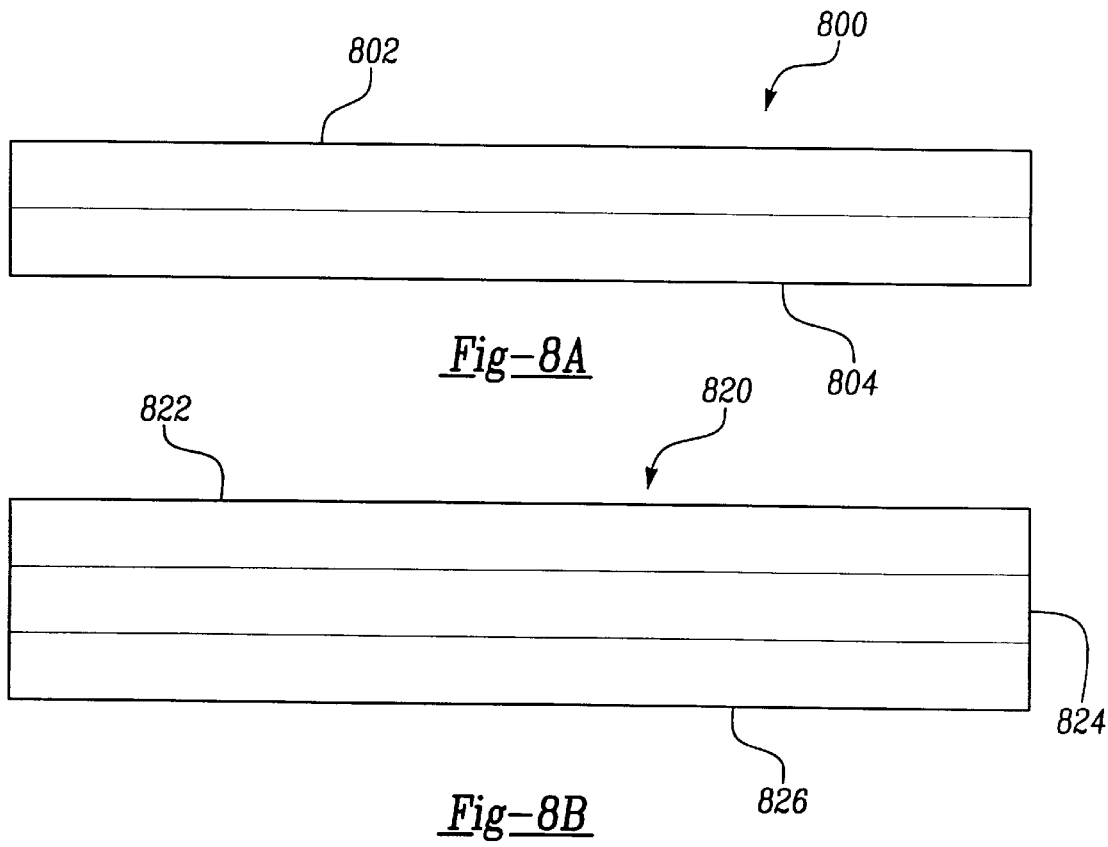

METHODS OF JOINING METAL COMPONENTS AND RESULTING ARTICLES PARTICULARLY AUTOMOTIVE TORQUE CONVERTER ASSEMBLIES

CROSS-REFERENCE TO RELATED CASES

This is a continuation of U.S. patent application Ser. No. 08/366,782, filed Dec. 30, 1994, now abandoned, which is a continuation-in-part of Ser. No. 08/297,986 filed Aug. 30, 1994, now abandoned, which is a continuation-in-part of Ser. No. 08/296,550 filed Aug. 25, 1994, now abandoned.

TECHNICAL FIELD OF THE INVENTION

The invention relates to joining metal components to one another, in a manner resembling brazing or soldering, particularly components of an automatic transmission such as the impeller or turbine thereof.

BACKGROUND OF THE INVENTION

It is generally well known to assemble components (workpieces) together by mechanical instrumentalities such as nuts and bolts, rivets, tabs and slots. For example, with respect to tabs (also known as "lugs" or "pawls") and slots (also known as "slits", "recesses", "grooves" or "indentations"), it is known to assemble blades (also known as "vanes") having tabs on their outer edges to an outer shell (also known as "bowl") of an automotive automatic transmission torque converter impeller or turbine (also known as a "vane wheel", jointly referred to herein as "bowl assemblies") having slots extending into or through its inner surface into which the tabs fit. Similarly, it is known to assemble an inner shroud component (also known as "core tube" or "torus ring") to the inner edges of the vanes by fitting tabs on the inner edges of the vanes through slots extending through the inner shroud component, then bending over the tabs. The use of tabs and slots to assemble vanes to the bowl and shroud of an automatic transmission impeller assembly is shown, for example, in U.S. Pat. No. 3,782,855 (the 1855 patent), and in U.S. Pat. No. 4,868,365 (the '365 patent), incorporated by reference herein. The following paragraphs emphasize certain problems attendant assembling vanes in a bowl of an automatic transmissions.

The '855 patent discloses a vane wheel for fluid couplings or torque converters, especially for motor vehicles. As disclosed therein, a plurality of vanes are disposed between two toroidal surfaces, an outer toroidal surface (e.g., a torque converter shell) and an inner toroidal surface (e.g., a torque converter shroud). As noted in the '855 patent the individual vanes have significant flexibility and, during abrupt changes in transmitted torque, the inner toroidal surface (i.e., the shroud) tends to displace itself angularly (e.g., rotate), vis-a-vis the outer toroidal surface (i.e., the bowl). The solution proposed in this patent is to provide separate and distinct (i.e., from the vanes 12) anti-rotational bracing members (plates 20) extending from the outer toroidal surface to the inner toroidal surface. These plates (20) are fixed by welding or soldering to the toroidal surfaces. In an embodiment of the '855 patent, the anti-rotational bracing members are formed as right-angle bent portions (30) at the ends of certain vanes (12), and these bent portions are advantageously force-fitted between the toroidal surfaces. In a further embodiment, bent portions (30) are formed facing one another on two adjacent vanes (12) and are connected by a bar (35) which is fixed to the bent portions and to the toroidal surfaces by welding, brazing or soldering.

A non-trivial problem in the fabrication and usage of vaned-impellers (or turbines) such as in automotive torque converters (e.g., the impeller assemblies thereof) is leakage (of fluid) occurring between the blades (vanes) and the toroidal surface of the bowl. Generally speaking, leakage will result in decreased fluid dynamic (hydrodynamic) efficiency which, in the context of an automotive torque converter, will translate into reduced gasoline (fuel) efficiency.

U.S. Pat. No. 5,282,362 (the '362 patent) discloses a technique for sealing (reducing leakage) involving the use of elastomeric linings on the core and shell surfaces, proximate the blades. The elastomeric linings are deformed where the blades engage the core and shell surfaces. This localized deformation effects a seal between the core and shell surfaces, which eliminates leakage between the cores and the shells, thereby increasing torque converter efficiency.

Returning to the challenge of affixing a plurality of vanes (blades) to a toroidal surface (especially the outer housing of a torque converter), there has been limited effort in recent years directed to welding the vanes into the bowl. For example, U.S. Pat. No. 4,868,365 (the '365 patent), entitled METHOD FOR WELDING TORQUE CONVERTER BLADES TO A HOUSING USING A LASER WELDING BEAM, discloses forming blades (vanes) with a tab fitted within a recess formed in the impeller housing (bowl) such that the blade stands clear of the adjacent surfaces of the housing by the width of an air gap. A laser beam is directed onto an adjacent surface of the housing a short distance from an edge of the housing adjacent a blade tab to be welded to the housing. A laser beam whose axis is inclined with respect to the recess strikes a surface of the housing adjacent the tab. The welding (e.g., laser) beam is moved parallel to the blade tab so that the blade tab is welded to the housing, without the use of filler material. The housing is rotated to bring successive blade tabs into position for welding.

As is evident, the technique of the "365 patent" amounts to "spot" (localized) welding of the blades to the bowl, and does not address the leakage problem addressed hereinabove. Moreover, in any process, such as those mentioned above, for affixing a plurality of blades to an automatic transmission impeller housing involving the use of slots in the impeller housing, in order to affix a different number or shape of blades to the bowl, or to affix the same (or a different) number of blades to the bowl at a different angle, it is necessary to modify the slot configuration (e.g., number, spacing, angle) of the bowl.

U.S. Pat. No. 5,109,604 (the '604 patent), incorporated by reference herein, discloses a method of assembling a torque converter impeller assembly showing traditional tab/slot assembly of the inner edges of the vanes to a semitoroidal core ring, and a technique of assembling the vanes and core ring as a subassembly to the interior surface of the outer shell (bowl). FIG. 4 of the '604 patent illustrates the process of fixturing (see fixture 39) the vanes for assembly of the core tube (via tabs and slots) to the inner edges of the vanes to fabricate the subassembly. A brazing material is applied to the outer (towards the bowl) edges of the vanes (as well as along the edges of the bent tabs on the inner edges of the vanes). The subassembly of the core ring and vanes, with brazing material applied thereto, is then positioned in the outer shell (bowl). The outer shell, vanes and core ring are then disposed in a brazing oven whereby the brazed metal (e.g., paste) flows along the outer edges of the vanes (as well as along the edges of the inner tabs of the vanes), to securely bond the vanes to the outer shell (as well as to complete the bonding of the core ring to the vanes). The advantages of this technique for assembling the vanes to the bowl, cited in the '604 patent, include:

(a) the vanes need not be aligned with special indentations in the bowl, thereby facilitating the assembly of the torque converter impeller; and (b) since the outer shell (bowl) does not require indentations (slots), it is not necessary to inventory outer shells by the orientation of the indentations in the outer shell. Outer shells can be used with a variety of vanes and it is easier to change from one vane configuration to another vane configuration.

Irrespective of the particular milieu of affixing vanes to the bowl component of an automatic transmission, brazing is a generally well known technique of joining components (e.g., two articles, two workpieces) to one another and generally involves melting (i.e., causing a thermal reaction in) a brazing material (also referred to as a "filler material") at temperatures of approximately 1000° C. (one thousand degrees Celsius). The brazing material (typically in paste form) may be the same as or different in composition from the material of the to-be-joined components. As distinguished from welding, brazing typically does not involve the melting of the components being joined together, and welding does. (See, e.g., the '365 patent which describes a welding beam melting a component being joined, and subsequent flow of the molten material.) Melting the components being joined together (as in welding) affects the grain orientation of the components, as well as any temper that may have been imparted to the component(s). Irrespective of whether a technique is classified as brazing or welding, the use of high temperatures can cause undesirable distortion, annealing, or the like of one or both of the components (workpieces) being joined together.

Disposing a torque converter impeller in a brazing oven, as disclosed by the '604 patent, is particularly problematic as it will result in "mass" (overall) heating of the components being assembled, as well as in distortion of the components. Such mass heating of the torque converter bowl is detrimental to the metallurgy of the bowl which may, for example, already have been provided with a hardened hub which will lose its temper as a result of such mass heating. Moreover, it is evident that a component heated in an oven to sufficient temperatures to effect brazing will require a significant, and in some cases controlled, cooling-off period.

U.S. Pat. No. 3,673,659 (the '659 patent), entitled METHOD FOR BONDING VANES IN [A] TORQUE CONVERTER, describes previous attempts at bonding vanes to a slotless impeller bowl by brazing, using a brazing paste which is a mixture of pulverized copper and alcohol, in an electric furnace. The method described in this patent involves temporarily connecting the vanes to the core ring by spot welding, then fitting this subassembly of vanes/core tube to the bowl. (This pre-fabrication of a subassembly, comprising vanes joined to the core tube for insertion as a unit into the bowl, is analogous to that of the aforementioned '604 patent.) Brazing material, in the form of copper rings (13a, 13b, 13c, 13d), is disposed between flanges (10a, 10b) on the vanes (10) and each of the core tube (11) and the bowl (12). Then, the to-be-brazed assembly is placed in an electric furnace which is filled with a suitable reducing atmosphere and is internally maintained at a temperature ranging from 1,110° C. to 1,130° C. to heat the assembly at a temperature higher than the melting point of the copper rings. The thermal cycle discussed in the "659 patent" is preliminary heating for 18 minutes (until the desired temperature is attained), maintaining the desired temperature for 10 minutes, and slowly cooling down the assembly for 54 minutes—a process taking approximately one and one half hours to achieve the sought after brazing of vanes. There is no suggestion in this patent that the resulting brazed joints are more than localized to the position of the copper rings (e.g., resulting in an analogue of spot-welding the vanes).

Further attention is directed to U.S. Pat. No. 4,833,295 (the '295 patent), entitled WELDING OF PARTS SEPARATED BY A GAP USING A LASER WELDING BEAM, which discloses a related technique for welding together two portions of a cover for a torque converter at an overlap joint using a welding beam.

Another phenomenon attendant automatic transmission bowl assemblies (impellers, turbines) is that the bowl component tends to "balloon" in response to the fluid pressures contained therein. This, of course, exacerbates any pre-existing leakage (i.e., between the vanes and the bowl) problem, since any gap between the vanes and the bowl will grow as the bowl balloons. Additionally, it is intuitively evident that such ballooning of the bowl imposes undesired stresses on the bowl and on any means of joining the vanes to the bowl, and that enhanced bowl stiffness (resistance to ballooning) would be desirable.

DISCLOSURE OF THE INVENTION

It is therefore an object of the present invention to provide an improved technique for joining any two (or more) components (workpieces) together (to one another).

It is another object of the present invention to provide a low mass temperature technique for joining any two (or more) components to one another.

It is another object of the present invention to provide an improved technique for assembling an automatic transmission impeller or turbine assembly (either of which is termed a "bowl assembly").

It is another object of the present invention to provide a technique for assembling a plurality of vanes to a bowl (component) of an automatic transmission bowl assembly that provides enhanced sealing of fluids being impelled by the vanes (or vanes being impelled by fluids, in the case of a turbine assembly).

It is another object of the present invention to provide a technique for assembling a plurality of vanes to a bowl of an automatic transmission impeller or turbine assembly that provides enhanced rotational stability between the bowl component and the shroud directly via the vanes, without requiring additional anti-rotational bracing members.

It is another object of the present invention to provide a technique for assembling a plurality of vanes to a bowl of an automatic transmission bowl assembly that provides for mounting (affixing) a different number (or shape) of vanes, and/or affixing the vanes at a different angle in the same bowl, without modifying the bowl itself (e.g., a slot configuration on the inner surface of the bowl component).

It is another object of the present invention to provide a technique for assembling a plurality of vanes to a bowl of an automatic transmission bowl (impeller or turbine) assembly that provides for the increased bowl stiffness (resistance to ballooning), without modifying the bowl itself.

According to the invention, a first component (or a plurality of first components) is joined to a second component using a joining material (delivered in the form of a paste, a powder, a glue-mixture, via a tape carrier, etc.) that preferably can be melted at temperatures lower, preferably much lower, than the melting point of the components being joined. An energy source such as a laser (alternative energy sources are described hereinbelow) reacts (e.g., melts) the joining material.

As used herein, the term "joining material" refers to a composition of material, for example a mixture of particulate elements (ingredients) in a form such as a paste, a slurry, an aerosol (e.g., deliverable in a manner similar to paint), a tape, a ribbon, or the like which reacts (e.g., melts, fuses, and the like) when an energy source (such as a beam from a laser, or a spark, an arc, a heat source such as a flame from a cigarette lighter, or the like) is directed thereat. Moreover, the term "joining" as used herein refers to the joining of components (workpieces and the like) by means other than mechanical means.

According to a feature of the invention, a laser (having a selected spot size) can be scanned over an "amount" (e.g., mass) of joining material (which is larger than the spot size) to react the joining material in its entirety. For example, the amount of joining material may be in the form or configuration of a layer, an elongated strip, or the like. Typically, for joining edges of two components, the configuration would be a strip.

According to a feature of the invention, a laser can be employed to initiate the reaction of a "self-sustaining" amount (or other form) of joining material, as described in greater detail hereinbelow.

In an embodiment of the invention, the first component is a vane (blade) joined to the inner, toroidal surface of an automatic transmission impeller bowl or the like (e.g., an automatic transmission turbine bowl), and the vanes are joined to the bowl with or without (preferably without) the use of tabs (on the vanes) or slots (in the bowl).

According to a feature of the invention, an amount of joining material is applied along the entire length of a joint between the two components sought to be joined. With respect to joining vanes to an automatic transmission bowl, leakage between the vanes and the bowl will be minimized thereby improving the fluid dynamic efficiency of the automatic transmission. Moreover, the vanes, securely affixed to the bowl by the techniques of the present invention, will act as stiffeners (ribs) to limit the outward expansion (ballooning) of the bowl.

According to a feature of the invention, a plurality of vanes are brazed to an automatic transmission bowl component using automated equipment (computer-controlled positioning mechanism) to place any number of vanes in the bowl at any desired angle, without requiring modification of the bowl itself.

In an embodiment of the invention, the joining material is formed of a material that, once a portion (e.g., an end, an intermediate portion, etc.) of the amount of joining material is "lit" (initiated, ignited) by the laser energy, will react exothermally to sustain (self-sustain) a reaction (e.g., melting) of the entire amount of the joining material. For example, the joining material contains nanoscale (<100 nm size) particles of aluminum (Al) or magnesium (Mg). Nanoscale-size particles of aluminum are more readily available than nanoscale-size particles of magnesium.

According to an aspect of the invention, a low-temperature joining material (e.g., paste, powder) contains nanoscale (<100 nanometer) size particles (elements, ingredients) of aluminum, magnesium, gold, cadmium, copper, zinc, tin, lead, silver, silicon, chromium, cobalt, antimony, bismuth, iron, carbon, boron, and alloys and composites of these materials. The nanoscale materials are suitable to react (e.g., melt) at temperatures of no greater than 400° C. (e.g., 200–400° C.). Preferably, the joining material contains sufficient amounts of exothermic material (e.g., nanoscale size particles of aluminum and/or magnesium) to be self-sustaining, once its reaction is initiated (e.g., by a laser beam).

For joining materials that do not contain nanoscale-size components, such as joining material containing 1–3 $\mu$m size particles (components) the melting temperature of such joining materials will inevitably be higher than 400° C.

According to an aspect of the invention, an energy beam such as a laser beam (for example provided by an Nd:YAG laser, a $CO_2$ laser, or other lasers, preferably operating in the infrared range), flame, arc, plasma, spark or the like, is "walked" (scanned) along the joining material, which is applied to a junction between two components to be joined. Preferably, a laser is used to react (melt) and/or to initiate (ignite) the joining material (which may be in the form of a paste, a powder, a tape, a glue or a putty), due to the ability to control the spot size of a laser, direct the beam with automated equipment, control the depth of penetration into the workpiece (component being brazed), and the like. Generally, in the self-sustaining embodiment, wherein a laser (e.g.) is used to initiate a self-sustaining joining material, penetration into the workpiece is not an issue.

In an embodiment of the invention, a plurality of vanes are brazed to the bowl component (i.e., the impeller or turbine bowl) and optionally to the shroud of an automatic transmission impeller assembly, preferably using a low-temperature joining material (e.g., in powder or paste form) containing nanoscale (<100 nanometer) size particles of aluminum, gold, cadmium, copper and/or zinc, cobalt, iron, nickel, silicon, and the like.

In a preferred embodiment of the invention, an Nd:YAG laser having a 200 W (Watt) output, emitting pulses of 0.5 ms (millisecond) duration at a frequency of 260 Hz (Hertz), with a beam diameter of approximately 1.5 mm (millimeters) is scanned over an amount of joining material (in the form of an elongated strip having a length of approximately two inches) in less than one second.

Generally, the beam has a diameter less than three millimeters, preferably between one and two millimeters. In the case of a non-circular beam, the "diameter" would be a linear cross-sectional dimension.

Generally, for purposes of reacting (and/or initiating) a joining material, it is preferred to use an infrared laser for its ability to generate heat, rather than to use an ultraviolet laser which would tend to ablate a material.

In an alternate embodiment of the invention, an Nd:YAG laser having a 500 W (Watt) output, emitting pulses of 1.0 ms (millisecond) duration at a frequency of 260 Hz (Hertz), with a beam diameter of approximately 1.5 mm (millimeters) is scanned over an amount of joining material (in the form of an elongated strip having a length of approximately two inches) in less than one second.

In a preferred embodiment of the invention, a self-sustaining joining material contains the following amounts, by weight, of the following materials, of the following particle size: 2% Cerium (<1 $\mu$m); 3% Boron (<1 $\mu$m); 5% Chromium (<1 $\mu$m); 12% Nickel (<1 $\mu$m); 18% Magnesium (1–3 $\mu$m, nanoscale if available); 15% Aluminum (nanoscale); 2% Tin (1–3 $\mu$m); 5% Zinc (1–3 $\mu$m); 20% Copper (1–3 $\mu$m); and 18% Silver (1–3 $\mu$m). (As is evident, these percentages are approximate, having been rounded off to the "ones" place, and total 101%). Other (e.g., alternative) recipes of ingredients for joining materials are described in greater detail hereinbelow.

The techniques of the present invention are also useful for joining components other than vanes and bowls, such as two flat plates together.

For example, in a "hemming" operation, a first plate extends beyond the edge of a second plate, and the extending edge of the first plate is folded back around the edge of the second plate. An elongated strip of joining material is applied along the length of the overlapping edge of the first plate, and joining is initiated by laser energy, either by scanning the laser beam along the elongated strip of joining material, or by initiating the reaction at a selected position (e.g., the end, the middle) along the elongated strip of joining material.

For example, self-sustaining joining material is applied as a layer between two flat plates, and joining is initiated at an exposed edge of the paste layer.

According to another aspect of the invention, vanes for automatic transmission bowl components (impeller, turbine) are formed as hollow members. Such hollow vanes are more rigid than flat (monolithic) vanes, and enhance the ability of the bowl component to be assembled without a shroud stabilizing the inner edges of the vanes. It is within the scope of this invention that flat (non-hollow) blades are assembled in a bowl component without a shroud. In any case, the present invention clearly contemplates a "shroudless" automatic transmission bowl assembly.

According to another aspect of the invention, shroudless bowl assemblies (impeller, turbine) of automatic transmissions allow for stator components to be fabricated which will perform the function of the shrouds, and which may be designed to enhance and/or alter the fluid dynamics of the torque converter (fluid coupling). In this aspect of the invention, vanes are secured to the bowl components of an automatic transmission without shrouds (e.g., core rings, torus rings), preferably by the technique of low-temperature joining, preferably using self-sustaining joining materials, as discussed hereinabove. A stator component of larger overall diameter extends into an otherwise "dead" zone (i.e., the radial zone previously occupied by the shrouds), wherein fluid passage from the impeller to the turbine (and vice-versa) would otherwise be impeded (directed, divided, delineated, diverted) by one or both of the shrouds, and a peripheral region of the stator subsumes the function of directing hydraulic fluid from the impeller, around a peripheral zone of the torque converter, to the turbine. This permits "tailoring" the dead zone to achieve configurable performance of the automatic transmission by modifying the stator component, without modifying the bowl (impeller, turbine) assemblies.

In one embodiment of the invention, the stator component has an annular (toroidal) ring disposed about its periphery, the annular ring being of similar size and radius to the shroud components that it "replaces".

In another embodiment of the invention, the stator component is provided with a disc like ring disposed about its periphery and aligned radially, extending into the dead zone otherwise occupied by the shroud components. This permits the vanes of the bowl component assemblies to be larger, extending (axially) nearly to the peripheral disc of the stator.

In either embodiment, by eliminating the shrouds (each shroud is a partial torus ring), the flow-directing function of the shrouds (e.g., of the annular ring formed by the opposing shrouds on the impeller and turbine assemblies) is "subsumed" by the stator assembly.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. Although the invention will be described in the context of these preferred embodiments, it should be understood that it is not intended to limit the spirit and scope of the invention to these particular embodiments.

FIG. 7A is a cross-sectional view of a technique for joining two components by "hemming" according to the present invention.

FIG. 7B is a cross-sectional view of a technique for joining two components by "laminating" according to the present invention.

FIG. 8A is a cross-sectional view of a two-part tape for delivering joining material according to the present invention.

FIG. 8B is a cross-sectional view of a three-part tape for delivering joining material according to the present invention.

DETAILED DESCRIPTION OF THE INVENTION

The present invention is directed to, as one of its principal objects, the joining of vanes (blades) to the bowl component of an automatic transmission bowl assembly (impeller or turbine). Various techniques for accomplishing this object are discussed hereinabove.

As is known, an automatic transmission system is a fluid coupling that comprises as its essential components an impeller acting as the driving member (imparting motion to the fluid), a turbine acting as the driven member (being acted upon by the moving fluid), and a stator acting as a reaction element.

Figure 1A:
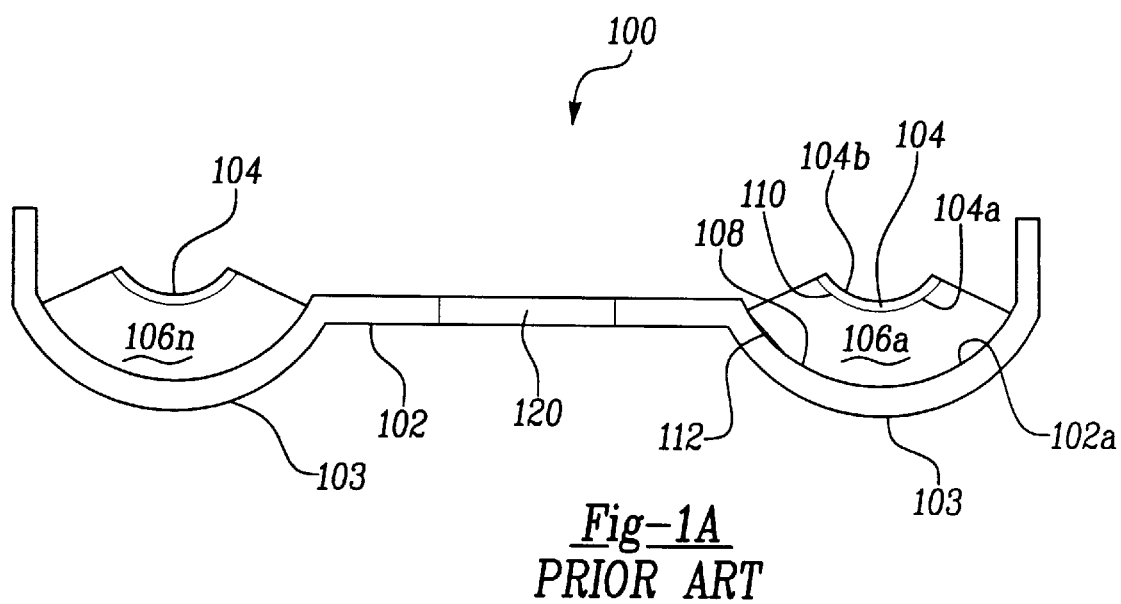
FIG. 1A is a cross-sectional view of an automatic transmission bowl (e.g., impeller) assembly of the prior art.
Figure 1B:
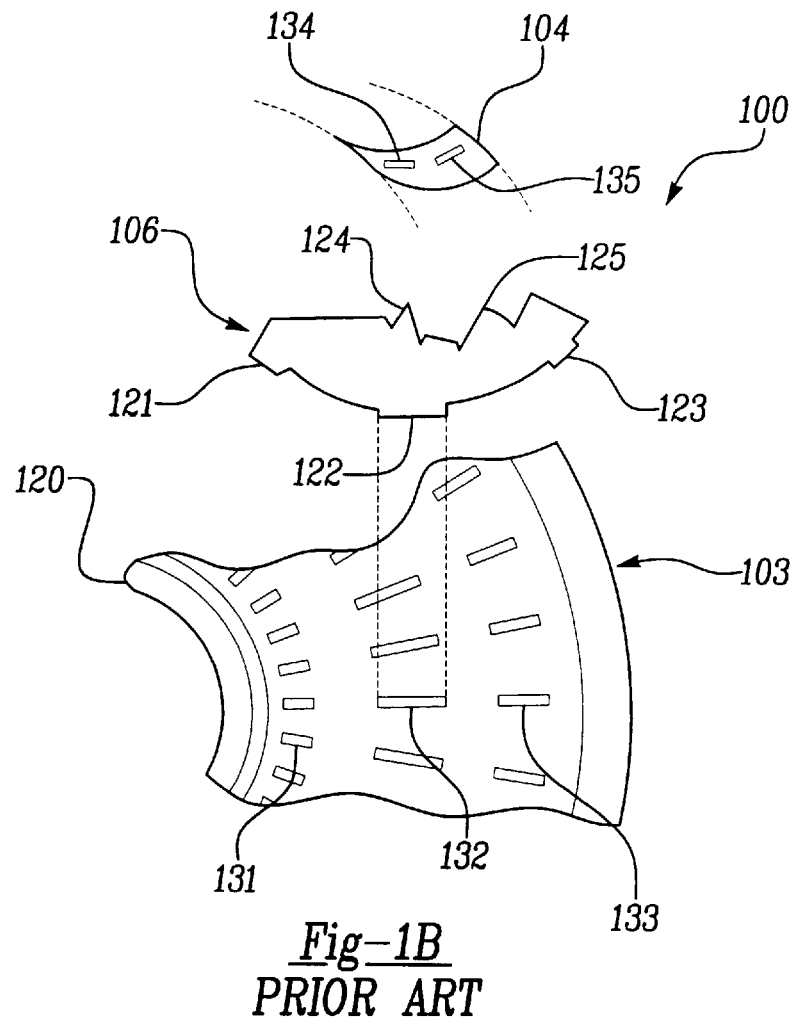
FIG. 1B is an exploded, partial perspective view of the automatic transmission bowl assembly of FIG. 1A.

FIGS. 1A and 1B illustrate an automatic transmission impeller assembly 100 of the prior art, which includes an outer bowl component 102, an inner shroud (torus ring) component 104, and a plurality of blade components 106 (106a through 106n). The bowl component 102 is bowl-like, as shown. The shroud component 104 is annular, as shown. The blade components 106 are essentially flat, monolithic (i.e., single layer) and arcuate, each blade having an outer (towards the bowl) arcuate edge 108 and an inner (towards the shroud) arcuate edge 110. A peripheral blade-receiving region 103 of the bowl component 102 is toroidal, its contour generally corresponding to the contour of the outer edges 108 of the vanes (blades) 106. The contour of the shroud component 104 corresponds to the contour of the inner edges 110 of the vanes (blades) 106.

Figure 2A:
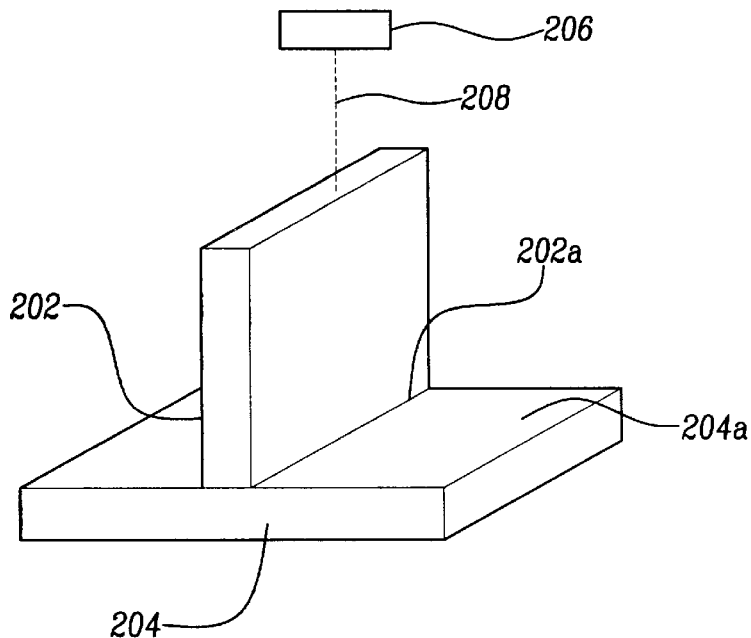
FIG. 2A is a perspective view of two components (workpieces) brought together for joining according to the present invention.
Figure 2B:
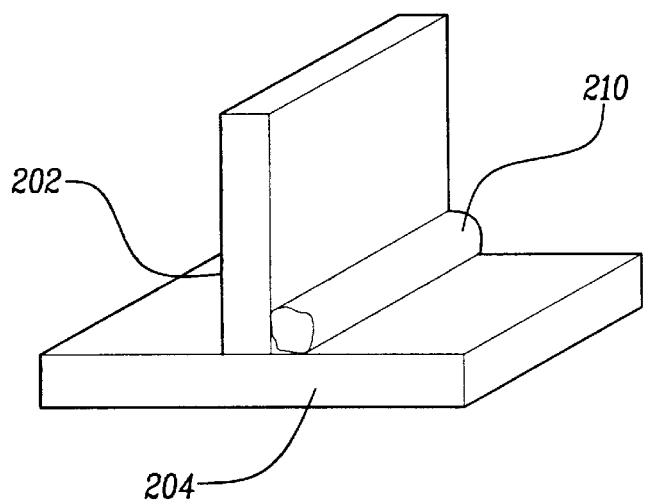
FIG. 2B is a perspective view of the two components of FIG. 2A, with a joining material disposed at the junction of the two components according to the present invention.

As best viewed in FIG. 1B, the outer edge 108 of a blade (only one of the plurality of vanes [blades] is shown in FIG. 2B as 106) is provided with three tabs 121, 122 and 123 that fit within corresponding slots 131, 132 and 133, respectively, in the toroidal portion 103 of the bowl component 102. In a similar manner, the blade 106 is provided with two tabs 124 and 125 that fit within corresponding slots 134 and 135, respectively, in the shroud component 104. As is known, after being inserted through the slots 134 and 135, the tabs 124 and 125 are rolled (bent) over on the inner surface of the shroud component to (i) retain the shroud component 104 and to (ii) hold the vanes (blades) in place. Generally, the vanes (blades) are prohibited from disengaging from the bowl component by virtue of being fixed to one another by the shroud component, which restricts their freedom to move in a direction that would cause the outer tabs (121, 122, 123) to disengage from the bowl slots (131,132,133). Generally, the bowl slots 131, 132 and 133 extend only partially through the bowl component from the inner surface thereof. (This is the general case with an impeller. In a turbine component, the slots in the bowl typically extend fully through the bowl.) However, as noted above, the shroud slots 134 and 135 extend completely through the shroud to allow the inner tabs (124 and 125) to pass therethrough and be bent over.

It is generally intended that the vanes 106 fit securely to the inner surface 102a of the bowl component 102 to prevent leakage of fluid between the vanes and the bowl component, and to maximize impelling of fluid by the vaned (bladed) bowl component. However, as noted hereinabove, this "leakproofness" is difficult to achieve, and various techniques have been proposed addressing this problem. Using mechanical means for securing the vanes to the bowl inevitably results in there being gaps between the vanes and the bowl component, which will result in diminished efficiency in use. In FIG. 1A, a stylized gap 112 is shown between the outer edge 108 of the blade and the inner surface 102a of the bowl component 102. FIGS. 1A and 1B are intended to be representative, not comprehensive, of the prior art and are presented to establish a non-limiting context for describing a particular application (usage) of the present invention.

As is shown in FIGS. 1A and 1B, a hub 120 is fitted to the center of the bowl component 102. Typically, the hub 120 is processed in a manner dissimilar from the bowl component. For example, the bowl component may be a casting or stamping, and the hub may be a heat treated (hardened), machined forging. As mentioned hereinabove, any mass heating of the bowl (with the hub in place) is likely to result in the hub losing its temper, and perhaps even distorting its aggregate round shape.

Another problem which has been mentioned hereinabove is that, under pressure (i.e., in operation), the bowl component will tend to balloon (expand), exacerbating any leakage (between the vanes and the bowl) that may already be present in addition to imposing a spurious stress on the bowl component. Leakage may also adversely affect the fluid flow characteristics of the fluid coupling (e.g., automatic transmission) under high torque-transmitting conditions.

As a general proposition, the function and purpose of the shroud component (104) is primarily to stabilize the vanes (106), and to direct the fluid flow. As is evident, the shroud component (104) does nothing to attenuate leakage between the vanes and the bowl. Nor is the shroud component (104) capable of significantly attenuating ballooning of the bowl component (102).

According to the invention, components such as vanes (blades) are joined by joining to components such as bowls and shrouds, preferably at relatively low temperatures without mass heating the components.

JOINING COMPONENTS TO ONE ANOTHER

Figure 2C:
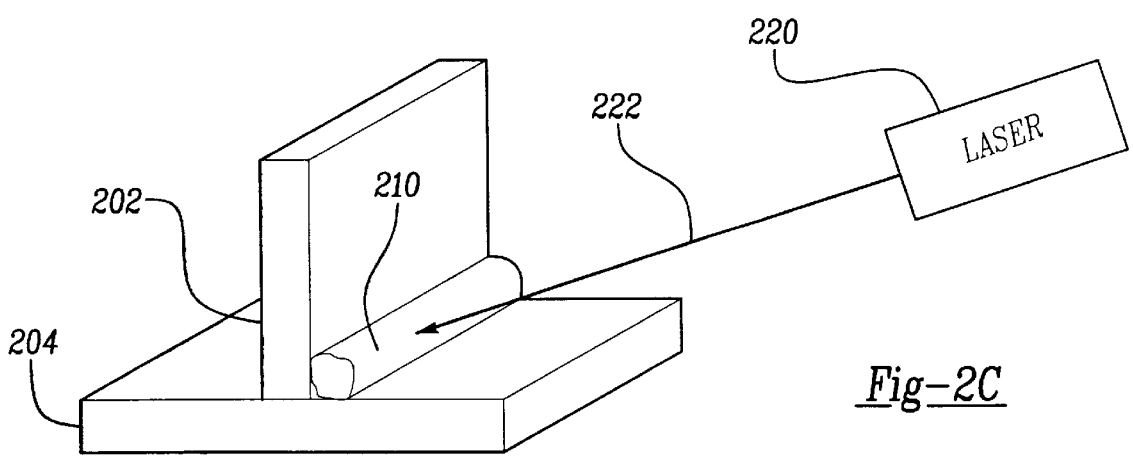
FIG. 2C is a perspective view of the two components of FIG. 2B, with an energy beam directed at the joining material according to the present invention.

FIGS. 2A, 2B and 2C illustrate the technique of the present invention in a stylized (generalized) manner. According to the invention it is desired to join two components together, such as steel components, without mechanical means such as tabs and slots. (Of course, the two components could first be joined, or partially joined, with mechanical means such as tabs and slots, but this is not illustrated in the figure.) To this end, one of the components 202 is butted up against another 204 of the components 204 by a suitable positioning (e.g., robotic) mechanism 206. In this example, an edge 202a of the one component 202 is butted up against a surface 204a of the other component 204, and the edge is expected to substantially conform to the surface. The dashed line 208 extending from the positioning mechanism 206 to the one component 202 indicates end effectors, linkages, control arms, and the like, for grasping the component 202 for positioning the component with the robotic mechanism 206. In order to effect such positioning, for components of complex geometry (such as the bowl 102 of FIG. 1), it is desirable to have a computer (database) "model" of the stationary component (e.g., 204), which may be held in a jig. In this manner, a plurality of non-stationary components (202) can be brought into a precise position and orientation with respect to locations on the stationary component (204). It is well within the purview of one having ordinary skill in the art to which this invention most nearly pertains to implement such a positioning mechanism (means). As will be evident, such a positioning mechanism is suitable for positioning a plurality of vanes in a bowl of an automatic transmission impeller assembly for holding the vanes (individually, or in groups) in place for joining (e.g., joining) the vanes to the bowl.

As shown in FIG. 2A, the components 202 and 204 have been brought together into their desired positional relationship with one another, which is preferably contacting one another.

Next, as illustrated in FIG. 2B, an elongated strip of joining material 210 is applied along the entire length of the junction of (at the seam between) the two components 202 and 204. As shown, the joining material 210 may be applied on both sides of the junction (i.e., both sides of the component 202), but the joining material need only be applied to at least one side of the junction (as shown in FIG. 2C). As discussed in greater detail hereinbelow, the joining material 210 may or may not be a "self-sustaining" material, and may or may not contain nanoscale-size particles (powders). The joining material may be in the form of a paste, a powder, a tape, an aerosol "painted" onto the components being joined, a pre-peg, etc. For example, a slurry (i.e., a mixture of elements) of a joining material can be formed on a transfer tape having a sacrificial backing, and applied by the medium of the tape to a joint to be brazed. Alternatively, a slurry of joining material could be printed (using screen printing techniques) onto specific areas of components (workpieces) to be joined by joining.

Next, as illustrated in FIG. 2C, an energy source provides an energy beam 222 directed at the joining material 210 to react or to ignite the joining material and cause the two components 202 and 204 to be joined (e.g., brazed) at the junction thereof.

The energy beam 222 is generated by any suitable means (220) such as a laser (for example an Nd:YAG or a $CO_2$ laser), flame, arc, plasma, spark, or the like, and is preferably controllable (such as with positionable mirrors, nozzles and the like—not shown) to be "walked" along the joining material 210. (In the case of a flame, arc or plasma, the beam 222 would not be a beam, per se, as it would be in the case of a laser energy source. However, the showing of a beam 222 is illustrative of the "outputs" of these alternative energy sources.) One having ordinary skill in the art to which this invention most nearly pertains will readily understand how to implement such motion control (e.g., directing the beam at a point, walking the beam along a joint, etc.) over a suitable energy beam.

The invention takes particular advantage of low-melting temperature joining materials such as have been disclosed in the aforementioned, commonly-owned, copending U.S. patent application Ser. No. 08/296,550. These materials include nanoscale (defined herein as <100 nanometers) size particles (powders) of gold, cadmium, copper, zinc, and the like. As noted therein, such nanoscale powders, having a relatively large surface area as compared with their volume, will exhibit a greatly reduced melting temperature (i.e., as compared with non-nanoscale particles). This makes their use ideal for applications where "normal" joining temperatures (of approximately 1000° C.) would cause undesirable distortion, annealing, or the like of one or both of the components being joined together. Nanoscale powder joining materials can be melted (recrystallized) to bond (join) the two components together at significantly lower temperatures (i.e., than the same materials in a bulkier, non-nanoscale phase)—for example, lower than 400° C. Such an "order of magnitude" improvement over traditional (high temperature) joining techniques affords numerous advantages expanding the utility of joining technology to applications heretofore deemed inappropriate for joining.

Among the exemplary advantages of using nanoscale materials (i.e., versus non-nanoscale materials) for joining components together is that the smaller size nanoscale materials allow the components being joined to be positioned closer together (with a smaller gap therebetween), which can result in more uniform joining of the components.

As mentioned above, a laser (220) can advantageously be employed to melt (react) the joining material, and can also be used to initiate a self-sustaining joining material. The benefits of using a laser (e.g., versus an electric arc, a flame, etc.) include:

(a) penetration depth (i.e., into the components being joined) can readily be controlled simply by controlling the laser output power;

(i) in the case of using the laser solely to initiate a self-sustaining joining material, penetration depth is, essentially, a non-issue;

(b) local heating, generally achieved by controlling the spot size (e.g., focusing) of the beam, ensures little heat transfer to the components being joined, and maximizes the energy on the joining material. The benefits of this feature include:

(1) greatly reduced thermal distortion of the component(s) being joined ("workpiece");

(2) joining can be performed in close proximity to heat-sensitive components; and (3) metallurgical damage of the workpiece, such as grain growth and annealing, is readily avoided.

(c) laser joining, such as disclosed herein, is well suited to automation.

There are several benefits of using nanocrystalline materials as, or as a component of, the joining material (e.g., paste, powder, etc.). Since surface atoms have lower coordination numbers than their bulk peers (larger particles of the same material) do, the mean square displacements of the atoms in crystallite increases significantly as the crystallite decreases and the number of surface atoms increases. Nanocrystalline materials (e.g., particles) have a very high surface area (for a given volume), and a significant portion of the atoms in a given nanocrystalline particle are on the surface of the particle. In fact, one may consider nanocrystalline materials as a transition structure between a bulk solid lattice and a single molecular structure. Consequently, many of the properties of bulk materials are significantly affected. For example, the melting points of nanocrystalline materials will tend to exhibit melting points that are much lower than those of a comparable bulk solid. For example, the melting points of many nanocrystalline metal phases are lower than 400° C. (whereas their bulk counterparts exhibit melting temperatures that are well in excess of 1000° C.).

Aluminum and magnesium are preferred materials for incorporating into the joining material (powder) paste, especially in their nanocrystalline form. (However, it should be understood that nanoscale aluminum is more readily obtained than nanoscale magnesium.) In the first instance, aluminum and magnesium are both extremely exothermic. Once they are ignited, the reaction (e.g., their burning) will sustain itself so long as the elemental metal remains. In fact, the oxidation reaction of aluminum gives off so much heat that it has been used to melt steel, for example, in the railway industry. (The heat of formation of $Al_2O_3$, from oxidation of aluminum, is −399.1 Kcal/mol. The enthalpy of fusion incident to iron and aluminum are only 3.6 and 2.6 Kcal/mol, respectively. This means that one mole of $Al_2O_3$ formed will provide sufficient heat to melt 112 moles of iron.)

According to the invention, a joining material containing aluminum and/or magnesium nanoscale powders is employed to effect not only low-temperature joining, but also to effect a self-sustaining reaction requiring only that a spot of the joining material be lit (ignited) to react the entire amount of joining material. The heat released by the exothermy of the reaction will sustain the reaction of the entire amount of joining material incorporating these exothermic materials. An exemplary joining material, having a significant content of both aluminum and magnesium nanoscale particles, is described hereinbelow. It is within the scope of this invention that only one of the nanoscale components (aluminum and magnesium) is utilized in the self-sustaining joining material. Of these two components, if only one were available, there would be a slight preference towards aluminum.

It is within the scope of this invention that the joining material and the beam are applied simultaneously to the junction of the two components being joined together (i.e., rather than first applying an elongated strip of joining material along the length of the to-be-formed joint, then reacting the elongated strip of joining material, as implied by FIGS. 2B and 2C). One having ordinary skill in the art to which this invention most nearly pertains will recognize, in light of the teachings contained herein, that powders (e.g., powders containing nanoscale particle components) can be delivered by means of a suitable pressurized nozzle, which is preferably mechanized. Evidently, when delivering the powder simultaneously (contemporaneously) with applying the energy (from the source 220), the powder and the beam (222) from the source (220) should both be directed at the same spot on the to-be-formed joint to ensure melting (reacting) of the joining material at that location.

The present invention advantageously employs a laser to react and/or ignite a joining material which preferably contains nanoscale, exothermic materials. A beam from the laser can be walked along a previously-applied amount of joining material to react (e.g., melt) the joining material, or can be used to ignite a localized portion of a self-sustaining, exothermic joining material.

In a preferred embodiment of the invention, particularly applicable to joining vanes to the bowl of an automatic transmission impeller assembly, an Nd:YAG laser having a 200 W (Watt) output, emitting pulses of 0.5 ms (millisecond) duration at a frequency of 260 Hz (Hertz), with a beam diameter of approximately 1.5 mm (millimeters) is scanned over an amount of joining material (e.g., in the form of an elongated strip having a length of approximately two inches) in less than one second.

In an alternate embodiment of the invention, an Nd:YAG laser having a 500 W (Watt) output, emitting pulses of 1.0 ms (millisecond) duration at a frequency of 260 Hz (Hertz), with a beam diameter of approximately 1.5 mm (millimeters) is scanned over an amount of joining material (e.g., in the form of an elongated strip having a length of approximately two inches) in less than one second.

EXAMPLE 1

In an embodiment of the invention, particularly applicable to joining vanes to the bowl of an automatic transmission impeller assembly, but not limited thereto, a "self-sustaining" (exothermic) joining material having the following material composition is employed:

| material | % (by weight) | particle size |
|---|---|---|
| Cerium | 2% | <1 $\mu$m |
| Boron | 3% | <1 $\mu$m |
| Chromium | 5% | <1 $\mu$m |
| Nickel | 12% | <1 $\mu$m |
| Magnesium | 18% | <1 $\mu$m |
| Aluminum | 15% | nanoscale |
| Tin | 2% | 1–3 $\mu$m |
| Zinc | 5% | 1–3 $\mu$m |
| Copper | 20% | 1–3 $\mu$m |
| Silver | 18% | 1–3 $\mu$m |

The relative amounts of these materials (elements, ingredients) can be incremented (or decremented) as desired for a particular application and, if nanoscale magnesium is available, it would be preferred in a mixture of a self-sustaining joining material.

Generally, elements such as chromium, nickel and boron contribute a fluxing function to the joining material; elements such as aluminum or magnesium imbue the joining material with its self-sustaining characteristic; and elements such as silver and copper contribute to the ductility, bond strength and fatigue strength of the resulting joint.

Generally, the particular elements will be selected according to the desired bond strength of the resulting joint, the materials of the components being joined, and other application-specific parameters.

EXAMPLE 2

Another mixture of elements suitable for use as a joining material, according to the present invention, comprises:

boron (<1 $\mu$m); nickel (<1 $\mu$m); nanoscale aluminum; copper (1–3 $\mu$m) silver (1–3 $\mu$m); and iron (preferably nanoscale).

EXAMPLE 3

Another mixture of elements suitable for use as a joining material, according to the present invention, comprises:

chromium (preferably nanoscale), aluminum (preferably nanoscale), and iron (preferably nanoscale).

EXAMPLE 4

Another mixture of elements suitable for use as a joining material, according to the present invention, comprises:

boron, chromium (preferably nanoscale), zinc (preferably nanoscale) and silver (preferably nanoscale).

As applied to joining vanes to the bowl of an automatic transmission impeller, as discussed below (with respect to FIG. 3), using such a joining material (e.g., the joining material of Example 1), in conjunction with the techniques of the present invention (e.g., initiating the self-sustaining joining material with a laser), resulted in a bond (braze) strength greater than 130,000 psi (pounds per square inch), and in overall (mass) heating of the bowl to only 35° C. (degrees Celsius), with localized heating of only 65° C.

It should be understood that, although the invention is principally described in the context of joining a plurality of vanes to a bowl of an automatic transmission impeller, the techniques described herein are applicable to virtually any other milieu wherein it is desired to effect the joining of two components in a controlled manner, especially when mass heating or overheating an adjacent area of the workpiece are of concern and are desired to be minimized or avoided.

JOINING VANES IN AN IMPELLER

Figure 3:
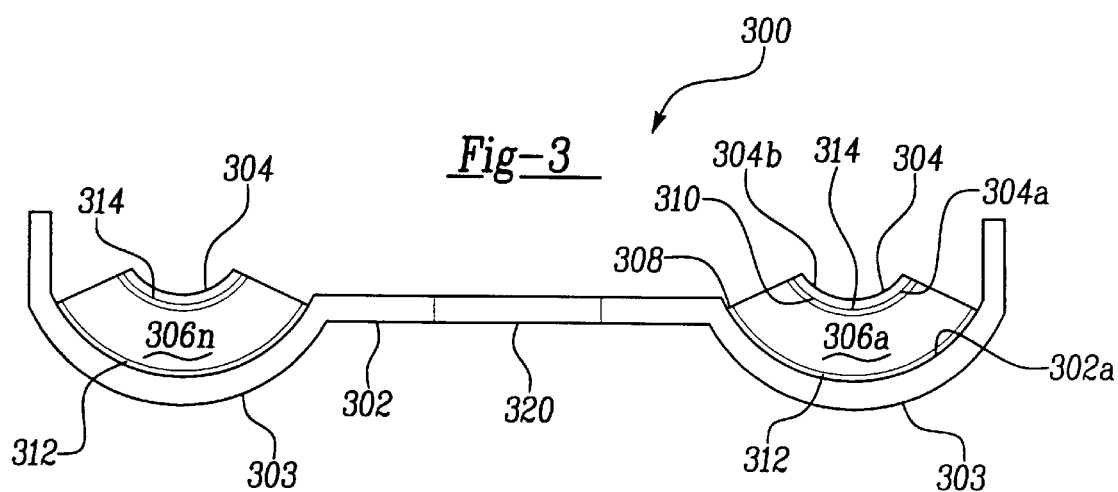
FIG. 3 is a cross-sectional view of an automatic transmission bowl (e.g., impeller) assembly that has been assembled according to the techniques of the present invention.

FIG. 3 illustrates components of an automatic transmission impeller assembly 300 assembled according to the techniques of the present invention, which includes an outer bowl component 302, an inner shroud component 304, and a plurality of blade components 306 (306a through 306n). The bowl component 302 is bowl-like (semitoroidal), as shown. The shroud component 304 is annular, as shown. The blade components 306 are essentially flat and arcuate, each blade having an outer (towards the bowl) arcuate edge 308 and an inner (towards the shroud) arcuate edge 310. A peripheral blade-receiving region 303 of the bowl component 302 is arcuate, its contour generally corresponding to the contour of the outer edges 308 of the vanes 306. The contour of the shroud component 304 corresponds to the contour of the inner edges 310 of the vanes 306. As is known, it is desired to mount the vanes 306 generally radially with respect to an axis of rotation of the bowl. As is known, the bowl may be provided with a central hub 320, which is heat-treated, hardened steel.

In contrast to the impeller assembly 100 of FIG. 1, in the impeller assembly 300 of FIG. 3 the outer 308 and inner 310 edges of the vanes 306 may or may not be provided with tabs (121 through 125) that fit within corresponding slots (131 through 135) formed in the bowl (102) and shroud (104) components, respectively. Rather, the vanes 306 are formed to fit precisely between the inner (towards the shroud) surface 302a of the bowl component 302 and the outer (towards the bowl) surface 304a of the shroud component, and are joined by joining materials 312 and 314 (compare 210) to the bowl 302 and shroud 304 components, respectively, so that the vanes are secured within the bowl in a manner that avoids (or at least minimizes) leakage between the vanes and the bowl and provides stiffening for the bowl, and that lends itself well to automated assembly procedures. Vis-a-vis avoiding (minimizing) leakage, it is preferred that the entire length of at least one side of each vane is brazed to the inner surface of the bowl. In this manner, there will be no gaps (compare 112) impeding the efficient impelling of transmission fluid, and there will be a corresponding increase in impeller efficiency which will translate to an increase in overall fuel efficiency for an automobile equipped with such a brazed-vane impeller. Generally, the present invention requires joining the vanes at least to the bowl, and optionally to the shroud. In the case of joining the vanes to the shroud, it is contemplated that the vanes would have tabs extending through slots in the shroud and, after being bent over, are brazed to the shroud. It is within the scope of this invention that the vanes are brazed solely to the bowl, and are affixed to the shroud using conventional tabs and slots. It is also within the scope of this invention, as will become evident from the description presented hereinbelow, that it is not necessary to have a shroud securing the inner edges of the vanes at all.

Vis-a-vis joining the vanes to the shroud without tabs and slots, by joining, assembling the vanes first to the bowl makes the joint between the vanes and the shroud somewhat inaccessible. In order to effect joining with a laser (and, preferably, using self-sustaining joining material), the beam (222) from the laser (220) is directed through a fiber optic cable having sufficient capacity to sustain the energies involved. Manipulation of the beam at these relatively inaccessible joints is readily accomplished with the use of a positioning mechanism (e.g., an industrial robot with appropriate end effectors).

FIG. 3 is intended to be representative, not comprehensive, of the many and varied applications of the techniques of the present invention. For example, it is well within the scope of this invention that a plurality of vanes are brazed to the bowl of a torque converter turbine in a manner similar to joining a plurality of vanes to the bowl of a torque converter impeller. In aggregate, the impeller bowl and the turbine bowl components are termed "bowl components" of an automatic transmission.

Among the numerous advantages of using the techniques of the present invention to affix a plurality of vanes to the bowl of an automatic transmission impeller assembly are:

(a) the brazed joint is sealed (leakproof, or leakage minimized) along its entire length, thereby enhancing the fluid dynamic efficiency of the impeller assembly;

(b) there is no significant mass heating of the bowl, thereby circumventing distortion and/or annealing of the bowl;

(c) the number, angle and shape of vanes affixed to the bowl are readily changed, without modifying the bowl (e.g., the slot arrangement in the bowl); and (d) the process is highly automatable (e.g., the vanes are readily positioned in the bowl by robotic equipment, the joining material is deliverable in various forms, and the energy are also readily delivered by automated equipment).

Another advantage of the present invention, vis-a-vis the prior art joining techniques discussed hereinabove, is that it is not necessary first to create a subassembly of vanes and shroud, then insert the subassembly into the bowl for joining. (However, it is within the scope of this invention that the vanes are first brazed to the shroud, then the subassembly of vanes/shroud is placed into a bowl, and the vanes are brazed to the bowl.) First of all, those techniques are more aptly suited to furnace (mass) heating of the bowl, which suffers from the problems associated with mass heating described above. Moreover, using those techniques requires the use of a jig to hold the vanes in place while the shroud is assembled to the vanes to create the subassembly.

According to an aspect of the present invention, a plurality of vanes are assembled (brazed) to a bowl component of an automatic transmission, one-by-one (or in groups, such as in diametrically opposed pairs of vanes), prior to joining the shroud component to the assembly (if at all). Preferably, the bowl component is held stationary, and the vanes are positioned in the bowl component by a suitable positioning mechanism (compare 206). Once in position, each vane is brazed individually to the bowl component, preferably by applying an elongated strip of the joining material along the entire length of the joint, then igniting the self-sustaining joining material with a directed beam from a laser.

Alternatively, it is possible to place all of the vanes into the bowl component, then braze them (e.g., one-by-one). This is facilitated, especially in the case of tabless vanes, by using a magnet (e.g., disposed under the bowl component) to temporarily hold the vanes in place for subsequent joining.

As mentioned above, a laser beam is suitably directed at the joining material (preferably a joining material containing nanoscale aluminum and/or magnesium elements) to effect joining of the two components. Since the cross-section and focus of such a beam can be controlled, this allows for localized heating during the joining process. For example, a laser beam having a cross section of 1 mm (one millimeter) is suitable for joining vanes to bowl components, as described above. Generally, lasers operating in the visible and infrared wavelengths are preferred for performing this heating (and igniting) function, ultraviolet lasers not being as efficient for heating and possibly causing undesired deposition sputtering.

As mentioned with regard to FIGS. 2A–2C, it is possible to first apply an elongated strip of joining material along the entire length of a joint between two components desired to be joined, and then "walk" the laser beam along the length of the elongated strip of joining material or, alternatively, to initiate a self-sustaining (exothermic) reaction by directing the laser beam at a single spot (localized area) on the elongated strip of joining material (e.g., such as at the end of the elongated strip of joining material so the reaction propagates unidirectionally along the length of the elongated strip of joining material, or at an intermediate portion of the elongated strip of joining material so that the reaction propagates bidirectionally along the length of the elongated strip of joining material). It was also discussed that the joining material (e.g., paste, powder) can be delivered to the joint simultaneously with delivery of the laser beam.

Figure 4:
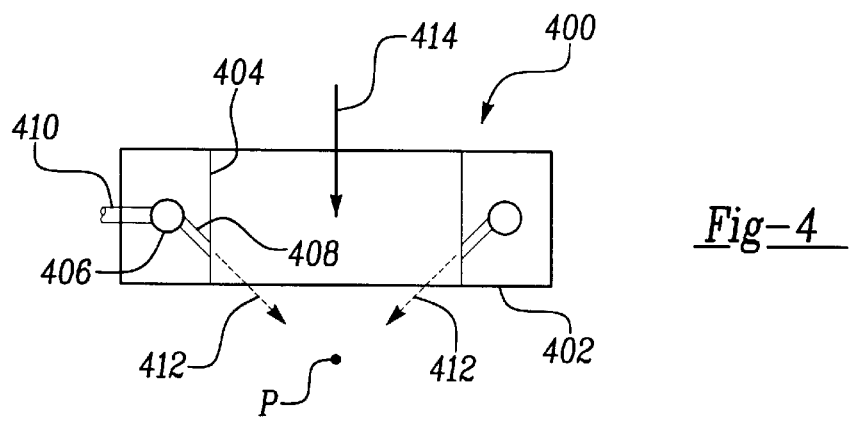
FIG. 4 is a cross-sectional view of an embodiment of a nozzle for delivering joining material simultaneously with applying an energy source according to the present invention.

FIG. 4 illustrates a nozzle 400 suitable for simultaneously (and, essentially coaxially) applying a joining material to a junction between two components while directing energy from a source (e.g., a laser) at the junction, to join the two components. The nozzle 400 has an annular, ring-like body portion 402 with an opening 404 extending therethrough (from "top" to "bottom"). A runner or manifold 406 is disposed circumferentially throughout the body portion 402. A plurality (one or more) of output orifices 408 extend from the manifold 406 to the opening 404 at an angle, so as to be directed at (aligned with) a point "P" that is co-axial with but offset below the nozzle. A single input orifice 410 communicates with the manifold 406 from exterior the nozzle body 402.

In use, material (such as joining material having nanoscale components) is supplied to the input orifice 410 of the nozzle from a source (not shown), and is directed at the point "P" as indicated by the dashed line(s) 412. Simultaneously, energy from a source, such as in the form of a laser beam, is directed through the nozzle at the point "P", as indicated by the line 414. In this manner, joining material (412) can be applied to a specific point (or small area) between two components, simultaneously with being heated to form a joint between the two components. When two or more output orifices 408 are provided, they should be aligned so that joining material exiting from each output orifice is coincident at the point "P". To form an elongated joint between the two components, the entire nozzle would be moved along the junction of the two components.

Figure 4A:
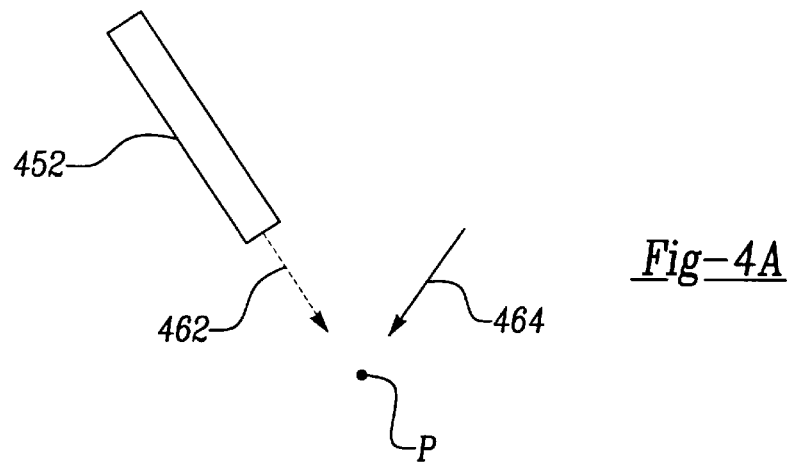
FIG. 4A is a cross-sectional view of an alternate embodiment of delivering joining material simultaneously with applying an energy source according to the present invention.

FIG. 4A illustrates an alternative embodiment for simultaneously delivering joining material and reacting energy to a joint between two to-be-joined components. The joining material is delivered by a nozzle 452, and is directed (as indicated by the arrow 462) at a point "P". Energy, such as from a laser, is also directed at the point "P", as indicated by the arrow 464.

Generally, as noted above, the invention contemplates laser joining of two or more articles (components, workpieces), using a joining material which may be the same as or different from the articles being joined. In all likelihood, the components being joined will not have the same material composition as the joining material. Although energy sources other than a laser are discussed, the use of a laser is generally preferred due to the ability to control the beam and consequent ability to localize heating of the junction between the two articles.

Depending upon the application for the joining techniques discussed above, and taking into account concerns that may exist over annealing and/or softening of the articles being joined, the laser operating parameters (e.g., wavelength, focus) can readily be adjusted to suit the application, and the characteristics (e.g., melting point and composition) of the joining material can readily be selected. The joining material may include self-synthetic/reactive materials. Among the advantages of the invention are the ability to exploit material characteristics of the articles being joined to limit adverse heat effects on the material of the articles, while ensuring high tensile strength of the joint being formed, limiting creep, and enhancing corrosion and fatigue resistance.

The joining material (e.g., 210, 312, 314) may be in the form of a gas, a solid, a liquid, or a solid/liquid mix. For joining steel articles, preferred joining materials include aluminum, magnesium, chromium, nitrogen, boron powders, iron, zinc, silicon, copper, silver, carbon, and combinations thereof.

It has been discussed hereinabove how the joining material and a laser may be simultaneously introduced to the junction of two components to be joined, and how the combination of joining material and laser may traverse the length of the junction. It is within the contemplated scope of this invention that the combination of joining material and laser not traverse the length of the junction. It may be possible to initiate the joining at one end (of the junction), and then have a continuous reaction extending to the other end of the junction (e.g., by traversing the length of the junction with joining material only, sans continued application of the laser after initiating the reaction).

Where the area to be joined is small (e.g., sub-micron), it may be necessary to use tightly-focused ultraviolet lasers and nanoscale joining materials.

HOLLOW VANES (BLADES)

Figure 5A:
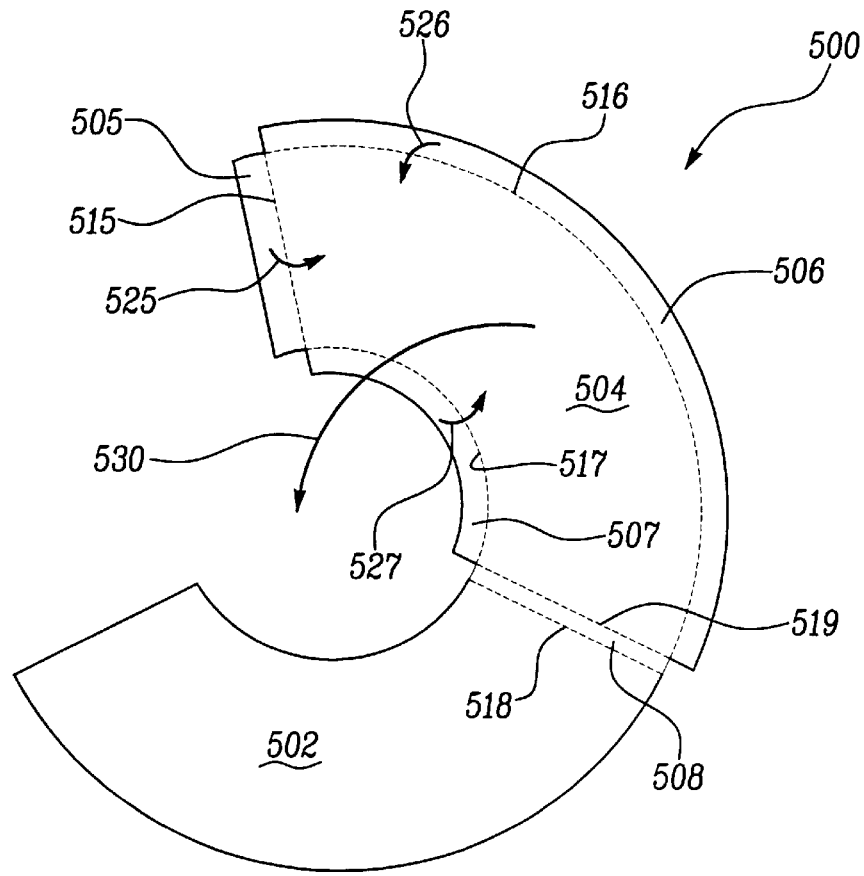
FIGS. 5A and 5B are flattened and folded (assembled) views, respectively, of a technique of forming a hollow turbine blade according to the present invention.
Figure 5B:
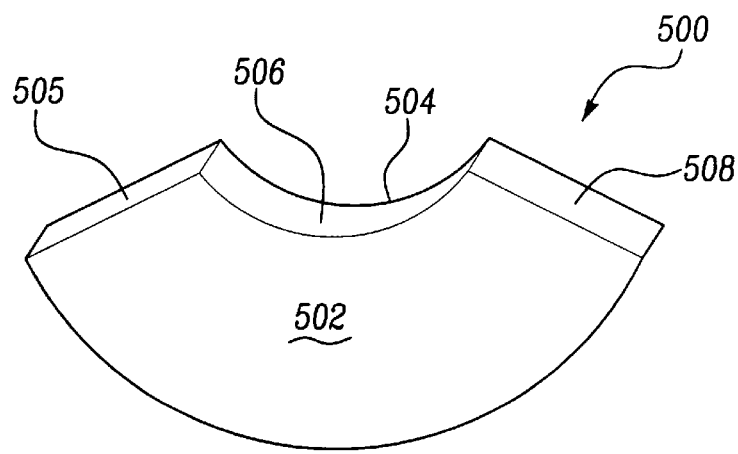

As mentioned hereinabove, one purpose of the shroud is to stabilize and/or rigidize the vanes by securing their inner edges (typically via tabs and slots). FIGS. 5A and 5B illustrate a technique for fabricating vanes that are more stable and/or rigid than the one-layer vanes of the prior art.

FIG. 5A shows a flat piece (single layer) of sheet metal which has been cut (stamped) into the shape of two arcuate sides 502 and 504 of an impeller blade. The side 502 has the arcuate shape of the impeller blade 306 of FIG. 3, and the shape of the side 504 is similar to the shape of the side 502. The side 504 is somewhat oversize, being provided with marginal regions 505, 506 and 507, outside of dashed lines 515, 516 and 517 that are intended to be bent over (as indicated by the arrows 515, 516 and 517, respectively), towards the side 502, when the side 504 is folded towards the side 502 (as indicated by the arrow 530) in order to impart a hollow, tubular structure to the finished impeller blade. The blade, so folded, and with its marginal regions bent, is shown in FIG. 5B. A marginal region 508 is disposed between the dashed lines 518 and 519, which are the ends of the respective sides 502 and 504. In FIG. 5B, the marginal region 505 is illustrated only partially bent over to meet the edge of the side 502.

Upon folding the side 504 towards the side 502 (arrow 530), and bending the marginal regions to meet the respective edges of the side 502, the edges of the marginal regions and the respective edges of the side 502 are joined together in any suitable manner, such as by joining, soldering or welding. Preferably, the joining technique of the present invention is employed to effect this edge-joining.

Figure 5C:
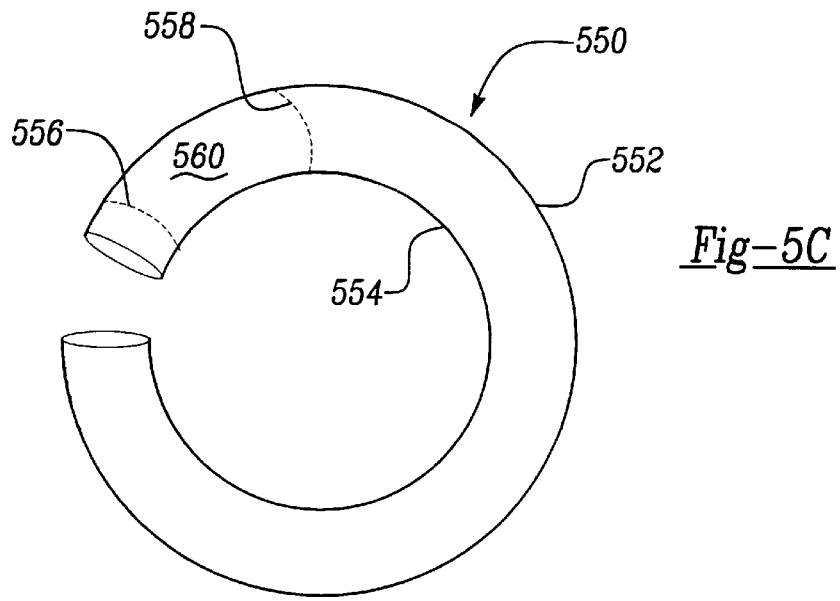
FIGS. 5C and 5D are pre-flattened and flattened views, respectively, of another technique of forming a hollow turbine blade according to the present invention.
Figure 5D:
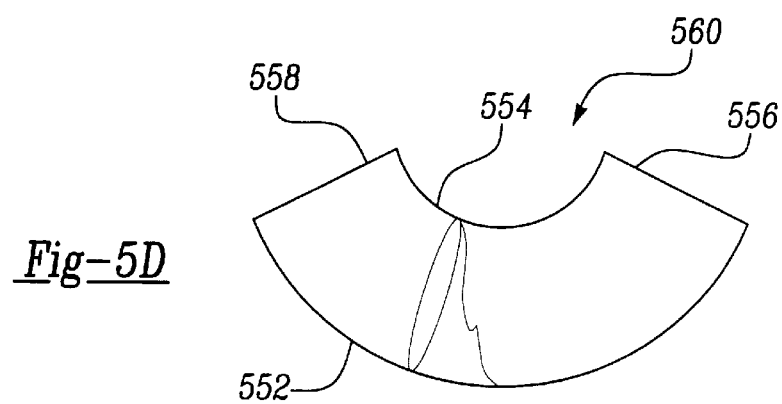

FIGS. 5C and 5D illustrate an alternative technique for forming hollow vanes. In FIG. 5C, a tubular stock 550, which may be in the form of a hollow ring having an outer periphery 552 and an inner periphery 554, is cut off at positions 556 and 558. The stock between these two positions 556 and 558 is then partially flattened, as shown in FIG. 5D, to form a hollow arcuate element suitable for use as a vane in an automatic transmission bowl assembly. The side edges 556 and 558 may be pinched off and joined to add to the rigidity of the hollow vane.

FIGS. 5A–5D are merely exemplary of techniques for forming hollow vanes. Generally, as will be evident, the increased rigidity accruing to a hollow (versus monolithic) vane can advantageously be employed to form shroudless bowl assemblies, as described hereinbelow. Generally, a hollow vane will exhibit greater inherent rigidity, as well as improved fluid dynamics, than the single layer vanes of the prior art, and it is contemplated by the present invention that vanes formed in this manner can be mounted to the bowl of an automatic transmission impeller without requiring a shroud to stabilize the vanes. Such vanes are preferably brazed to the bowl using the low-temperature, self-sustaining joining material techniques disclosed herein.

There have been described a number of different techniques for forming hollow vanes. It is within the scope of this invention that other techniques for forming hollow vanes be employed.

STATOR COMPONENT

Figure 6:
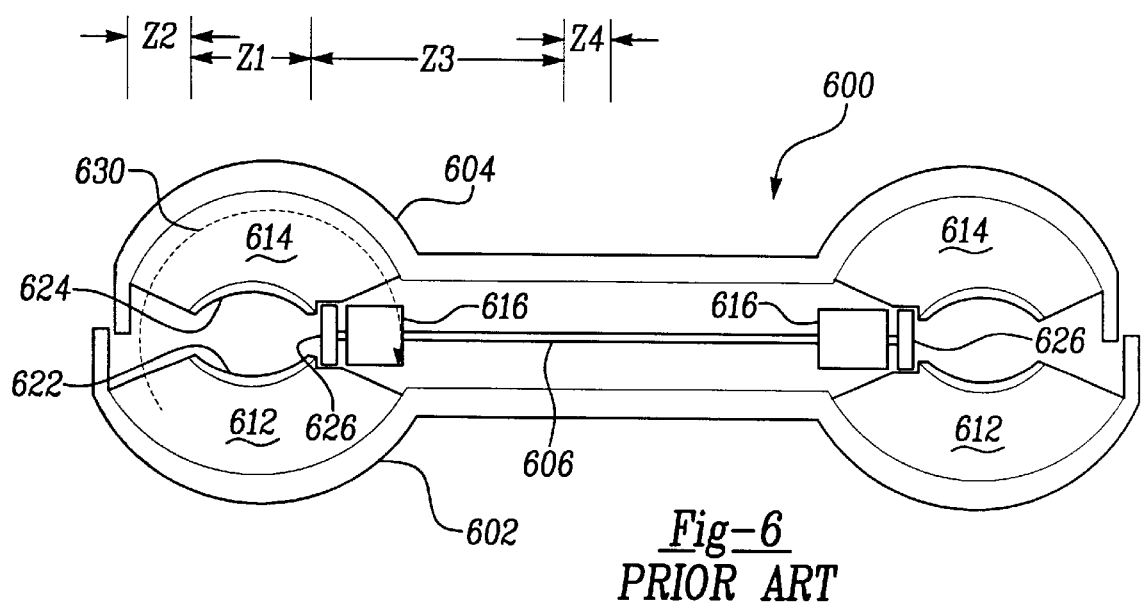
FIG. 6 is a stylized cross-sectional view of an automatic transmission having an impeller, a turbine and a stator according to the prior art.

The discussion presented hereinabove has emphasized the impeller and turbine assemblies of an automatic transmission. As is known, an automatic transmission typically includes three major components in its fluid coupling: (a) the impeller assembly, (b) a turbine assembly, and (c) a stator assembly. FIG. 6 shows a typical arrangement 600 of these three components, wherein the turbine assembly 604 is similar to (for illustrative simplicity) and disposed facing the impeller assembly 602, and the stator assembly 606 is disposed between the impeller assembly 602 and the turbine assembly 604. Each of these three assemblies are provided with vanes 612, 614 and 616, respectively. The inner edges of the vanes 612 (compare 106) are retained by a shroud 622 (compare 104), and the inner edges of the vanes 614 (compare 106) are retained by a shroud 624 (compare 104). An outer ring 626 is disposed on the periphery of the stator 606. The turbine assembly 604 is of a slightly smaller outside diameter than the outside diameter of the impeller assembly 602, so that the impeller bowl overlaps the turbine bowl. As is evident, the stator assembly 606 is smaller than either of the impeller assembly 602 or the turbine assembly 602, its outer diameter being approximately equal to the inner diameter of the shrouds 622 and 624. Typically, the vanes 612 and 614 are notched (as shown) to accommodate the outer ring of the stator 606. Moreover, it is evident that the shrouds 622 and 624, although spaced from one another, form an annular ring.

In the illustration of FIG. 6, "inner" components (such as hubs, shafts, and the like of the automatic transmission are omitted, for illustrative clarity. Moreover, as will be evident, the invention is principally directed to the structure of the outside (outer periphery) of the stator, rather than to its inner (e.g., towards the axis of rotation) "workings". Hence, the inner workings of the stator are stylized, for illustrative clarity.)

Generally, the stator 606 performs its principal function at low operating (rotating) speeds, preventing hydraulic fluid from being flung back at the impeller 602 by the turbine 604. The vanes 616 of the stator 606 are shaped so that they redirect the hydraulic fluid being flung back by the turbine at the impeller in the same direction that the impeller is moving and already throwing fluid.

As is evident from the cross-section of FIG. 6, the shrouds 622 and 624 effectively block transmission fluid from flowing between the impeller and the turbine at a radial "dead" zone (Z1) occupied by the shrouds, the transmission fluid being caused to flow from the impeller to the turbine in a radial zone (Z2) outside of the radial zone (Z1) occupied by the shrouds, and transmission fluid which is flung back from the turbine at the impeller being directed (i.e., redirected) by the stator in a central region (Z3) interior of the radial zone (Z1) occupied by the shrouds. Generally, fluid not flowing in a central (axial) zone (Z4) is occupied by hubs, shafts, one-way clutches, thrust bearings and the like, all of which are omitted from the figure (for illustrative clarity). The overall flow of hydraulic fluid from the impeller, around the outer zone (Z2), across the turbine vanes (614), back and through the stator (606) in an inner zone (Z3) is generally indicated by the arrow 630. As is evident, the dead zone (Z1) is of significant extent which, intuitively, is of little or no benefit to the desired goal of imparting motion (via the hydraulic medium) from the impeller to the turbine.

According to a feature of the invention, vanes (612, 614) are secured to the bowl components (602, 604) of an automatic transmission without shrouds (622, 624), preferably by the technique of joining as discussed hereinabove. The dead zone (Z1) is more effectively controlled, and the construction of the bowl components (602, 604) is simplified (e.g., by being shroudless), by extending the stator component (606) into the dead zone. This permits "tailoring" the dead zone to achieve configurable performance of the automatic transmission without modifying the bowl component assemblies.

In one embodiment of the invention, the stator component has an annular ring disposed about its periphery, the annular ring being of similar size and radius to the shroud components that it "replaces".

In another embodiment of the invention, the stator component is provided with a disc like ring, disposed about its periphery and aligned radially, extending into the dead zone otherwise occupied by the shroud components. This permits the vanes (612, 614) of the bowl component assemblies to be larger, extending nearly to the marginal disc of the stator. In either embodiment, by eliminating the shrouds (622, 624) retaining the inner edges of vanes (612, 614) on the impeller (602) and turbine (604) bowl components of an automatic transmission, the flow-directing (flow-blocking) function of the shrouds (e.g., of the annular ring formed by the opposing shrouds on the impeller and turbine assemblies) is "subsumed" by the stator assembly. This provides the flexibility for designers skilled in fluid dynamics to optimize turbine, impeller and stator interface designs.

Figure 6A:
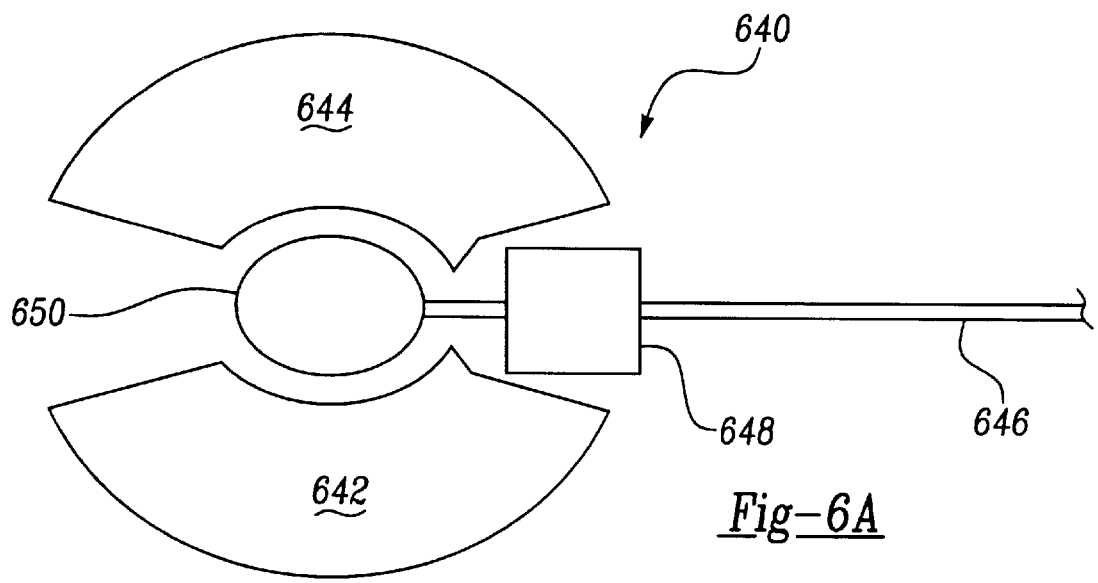
FIG. 6A is a cross-sectional view of a portion of an automatic transmission having an impeller, a turbine and a stator according to an embodiment of the present invention.

FIG. 6A shows an embodiment 640 of relevant components of an automatic transmission, according to an embodiment of the present invention, a notable feature of which is that there are no shroud components (compare 622, 624), and the stator is caused to extend "disc-like" into a zone (Z1) which otherwise would have been occupied by the shroud components. An impeller bowl (omitted from this figure, for illustrative clarity) is provided with a plurality of vanes 642, each of which is generally arcuate in a manner similar to the vanes (612, 106, 306) described hereinabove, and each of which may be fabricated as hollow vanes, as described hereinabove. Joining the vanes 642 to the impeller bowl using low temperatures as described hereinabove is preferred. A turbine bowl (omitted from this figure, for illustrative clarity) is provided with a plurality of vanes 644, each of which is generally arcuate in a manner similar to the vanes (612, 106, 306) described hereinabove, and each of which may be fabricated as hollow vanes as described hereinabove. Joining the vanes 644 to the turbine bowl using low temperatures as described hereinabove is preferred.

A stator 646 is provided with a plurality of vanes 648, preferably disposed on the stator in the inner zone (Z3), as in the prior art (see, e.g., FIG. 6). In this embodiment, the stator extends into the intermediate "dead" zone (Z2) which otherwise would have been occupied by the shrouds (622, 624). The peripheral edge of the stator is provided with an annular ring (torus) 650, which may be formed as a part of the casting of the stator, or which may be added as a separate element to the stator. The ring 650 is circular, or nearly-circular (i.e., elliptical), and is disposed so as to be in the same location as the shrouds (622, 624) which it "replaces" (i.e., functionally, with regard to controlling fluid flow), and has a cross-sectional diameter which is no greater than, and preferably only slightly smaller than, a circular space defined by the inner edges of the vanes 642 and 644 (so that the ring does not contact the vanes). The vanes 648 perform the flow re-directing (reversal) function of the vanes 616 of the prior art, and the peripheral extension of the stator (including the ring 650) performs the flow-directing function of the shrouds (622, 624) of the prior art.

Figure 6B:
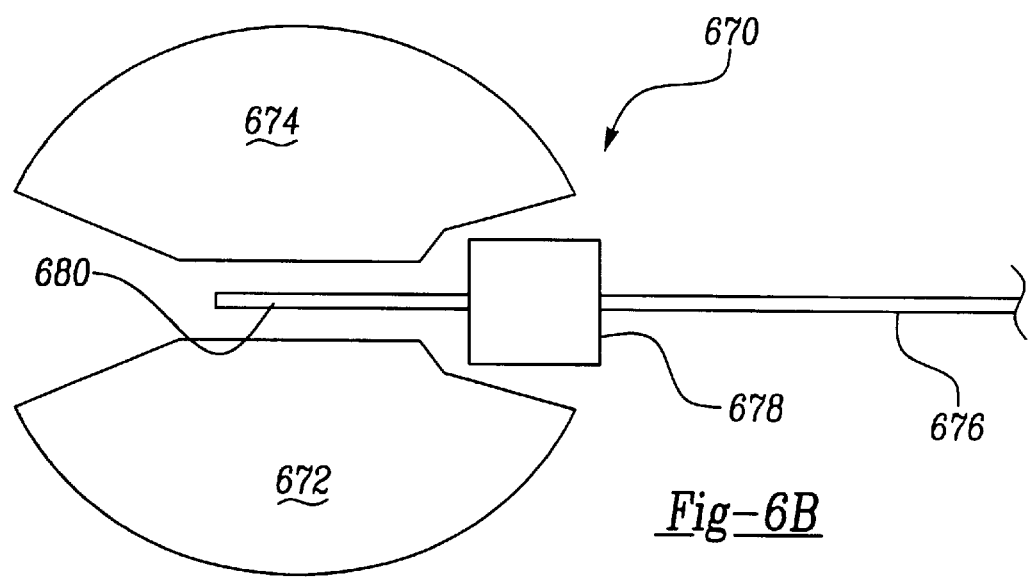
FIG. 6B is a cross-sectional view of a portion of an automatic transmission having an impeller, a turbine and a stator according to an alternate embodiment of the present invention.

FIG. 6B shows an alternate embodiment 670 of relevant components of an automatic transmission, according to an embodiment of the present invention, a notable feature of which is that there are no shroud components (compare 622, 624), and the stator is caused to extend into a zone (Z1) which otherwise would have been occupied by the shroud components. An impeller bowl (omitted from this figure, for illustrative clarity) is provided with a plurality of vanes 672, each of which is generally semicircular (rather than arcuate), and each of which may be fabricated as hollow vanes, as described hereinabove. (The vanes 672 and 674 have a generally straight inner edge, versus the arcuate inner edge of the vanes 612 and 614 of the prior art.) Joining the vanes 672 to the impeller bowl using low temperatures as described hereinabove is preferred. A turbine bowl (omitted from this figure, for illustrative clarity) is provided with a plurality of vanes 674, each of which is generally semicircular (rather than arcuate) and each of which may be fabricated as hollow vanes, as described hereinabove. Joining the vanes 674 to the turbine bowl using low temperatures as described hereinabove is preferred.

A stator 676 is provided with a plurality of vanes 678, preferably disposed on the stator in the inner zone (Z3), as in the prior art (see, e.g., FIG. 6). In this embodiment, the stator extends into the intermediate "dead" zone (Z2) which otherwise would have been occupied by the shrouds (622, 624). The peripheral edge of the stator is provided with a disc-like (flat ring-like) extension 680, which may be formed as a part of the casting of the stator, or which may be added as a separate element to the stator. The peripheral disc extension 680 is disposed so as to be in the same location as the shrouds (622, 624) which it "replaces" (i.e., functionally, with regard to controlling fluid flow), and has a thickness corresponding to (no greater than, preferably only slightly smaller than) a gap between the straight inner edges of the vanes 672 and 674 (so that the disc extension does not contact the vanes). The vanes 678 perform the flow re-directing (reversal) function of the vanes 616 of the prior art, and the peripheral extension of the stator (including the disc extension 680) performs the flow-directing function of the shrouds (622, 624) of the prior art. In this embodiment, the radial extent of the disc extension 680 is readily altered to permit more flow from the impeller to the turbine (i.e., by shortening the disc extension, thereby increasing the extent of the zone Z2) or to permit less flow from the impeller to the turbine (i.e., by lengthening the disc extension, thereby decreasing the extent of the zone Z2). In this manner, the "behavior" (energy transfer characteristics) of hydrodynamic coupling between the impeller and the turbine is readily controlled and altered for different circumstances (e.g., street driving, racing, etc.). For example, for vehicles which are driven primarily at high speeds, and which are not required to undergo repeated stopping and starting, it may be preferred to shorten the disc extension to permit maximum flow of hydraulic fluid from the impeller to the turbine at medium-to-high engine RPMs.

In the shroudless embodiments, using an extended stator, described hereinabove it is desired that the vanes are sufficiently rigid to not require a shroud to stabilize their inner edges. Although the hollow vanes disclosed herein satisfy this requirement, it is within the scope of this invention that any stiff vane, including monolithic (single layer, not hollow) vanes, would be advantageously employed with the stator of the present invention. A notable feature of the stator of the present invention, contrasting with the prior art stator described hereinabove (see, e.g., FIG. 6) is that the stator (which is disposed between the impeller bowl and the turbine bowl and between the vanes of these respective bowls) extends radially to at least a radial midpoint of the vanes. The radial extent of the prior art stator (606) is limited by the shrouds (622, 624) which are disposed at the radial midpoints of the vanes (612, 614).

HEMMING AND LAMINATING

In FIGS. 2A, 2B and 2C, discussed hereinabove, it was demonstrated that two metal components can be joined together, by joining an edge of one of the two components to a surface of the other of the two components. This technique is particularly pertinent to the joining of vanes to the bowl of an impeller assembly. In FIGS. 7A and 7B, the description of which follows immediately hereinbelow, the applicability of the present invention to the joining of two components in other configurations is demonstrated.

FIG. 7A shows a technique 700 for "hemming" two, in this example flat, pieces of metal 702 and 704 together. The joining techniques of the present invention are advantageously employed to effect this purpose.

An edge portion 706 of the one piece of metal 702 extends (advertently) beyond the corresponding edge 708 of the other piece of metal 704. The extending edge portion 706 of the piece 702 is bent over (e.g., 180°, or folded nearly back upon itself) to "capture" an edge portion (from the edge 708 inward) of the piece 704.

Joining material 710, preferably a low temperature joining material having a composition according to the present invention, is disposed (by any of the aforementioned means) along a joint formed at the extreme edge 712 of the piece 702 and a region 714 of the piece 704 immediately underlying the edge 712.

A laser 720 directs a beam of energy (as indicated by the arrow emerging from the laser) at the joining material 710 and either (i) walks along the elongated strip of joining material to effect joining of the two pieces 702 and 704, or (ii) initiates a self-sustaining joining material such as has been described hereinabove.

This technique of joining two metal pieces together, such as by hemming and low-temperature joining, permits the two pieces of metal to be joined without significant mass heating, and the various advantages of the present invention accruing to avoiding significant mass heating will be attained.

FIG. 7B shows a technique 750 for "laminating" two, in this example flat, pieces of metal 752 and 754 together. The joining techniques of the present invention are advantageously employed to effect this purpose.

A thin layer 760 of joining material, preferably a self-sustaining joining material formulated according to the techniques of the present invention disclosed hereinabove, is disposed between opposing surfaces 756 and 758 of the two pieces 752 and 754, respectively. This "sandwich" of metal/ joining material/metal could be disposed in an oven to effect melting of the joining paste and joining of the two metal pieces. However, such mass heating would result in all of the disadvantages of mass heating described hereinabove.

According to the present invention, the joining material which is sandwiched between to-be-laminated pieces of metal is initiated by a laser 770 directing a beam (as indicated by the arrow emerging from the laser) at an exposed edge of the joining material. The entire unaccessible (i.e., sandwiched between two metal pieces) layer of joining material, being self-sustaining, will react upon initiating a small portion thereof.

This technique of joining two metal pieces together, such as by laminating and low-temperature joining, permits the two pieces of metal to be joined without significant mass heating, and the various advantages of the present invention accruing to avoiding significant mass heating will be attained.

TAPE DELIVERY SYSTEM

As discussed hereinabove, the joining material can be delivered as a powder, applied as a paste, sprayed as an aerosol, or applied as a tape to the joint of to-be-joined components.

FIG. 8A illustrates a two-layer tape 800 that is well-suited to performing field joining. The two-layer (two-part) tape 800 has a first part 802 formed of aluminum (or of a sacrificial carrier laced with nanoscale aluminum particles), and a second part 804 having an oxidizing agent (such as peroxide).

FIG. 8B shows a three-part tape 820, having a first aluminum part 822 (compare 802), a second oxidizing agent part 826 (compare 804) and a third part 824 of microcellular foam material laced with peroxide.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected.

What is claimed is:

1. Method of joining components together, comprising:
   positioning one component adjacent another component;
   applying a self-sustaining exothermic joining material including a first part comprising nanoscale size particles and a second part comprising a metal having particulate sizes of between 1–3 $\mu$m to at least one junction between the one component and the other component; and
   directing an energy source at said self-sustaining exothermic joining material for initiating a continuous exothermic reaction along said junction between said one component and said other component for joining said components together.

2. Method, according to claim 1, wherein:
   the energy source is a laser.

3. Method, according to claim 2, wherein:
   the laser is an Nd:YAG laser.

4. Method, according to claim 2, wherein:
   the laser provides a beam having a cross-sectional linear dimension of less than three millimeters.

5. Method, according to claim 4, wherein the cross-sectional dimension of the beam is between two and three millimeters.

6. Method, according to claim 1, wherein:
   the energy source is selected from the group of energy sources consisting of arc, plasma and spark.

7. Method, according to claim 1, wherein:
   the one and the other components are steel.

8. Method, according to claim 1, wherein:
   the joining material includes nanoscale elements.

9. Method, according to claim 1, wherein:
   the joining material includes at least a portion, by weight, of nanoscale size particles of an exothermic material.

10. Method, according to claim 9, wherein:
    the exothermic material is aluminum.

11. Method, according to claim 9, wherein:
    the exothermic material is magnesium.

12. Method, according to claim 9, wherein:
    the joining material contains nanoscale size particles of aluminum and of magnesium.

13. Method, according to claim 1, wherein:
    the joining material contains 18% by weight magnesium of nanoscale particle size.

14. Method, according to claim 1, wherein:
    the joining material comprises 15% by weight aluminum of nanoscale particle size.

15. Method, according to claim 1, wherein:
    the joining material comprises nanoscale size particles selected from the group consisting of gold, cadmium, copper, zinc, tin, lead, silver, silicon, chromium, cobalt, antimony, bismuth, aluminum, iron, magnesium, nitrogen, carbon, boron, and alloys and composites of these materials.

16. Method, according to claim 1, wherein said self-sustaining exothermic joining material contains nanoscale-size material smaller than approximately 100 nanometers.

17. Method, according to claim 1, wherein said self-sustaining exothermic joining material includes boron (<1 $\mu$m), nickel (<1 $\mu$m), nanoscale aluminum, copper (1–3 $\mu$m), and iron.

18. Method, according to claim 1, wherein said self-sustaining exothermic joining material includes chromium, aluminum, and iron.

19. Method, according to claim 1, wherein said self-sustaining exothermic joining material includes boron, chromium, zinc, and silver.

20. Method of joining components together, comprising:
    positioning one component adjacent another component;
    applying a joining material to at least one junction between the one component and the other component, the joining material including a first part comprising nanoscale size particles of an exothermic material and a second part comprising copper having particulate sizes of between 1–3 $\mu$m; and
    directing an energy source solely at the joining material;
    wherein:
    the one component is a first plurality of vanes, each vane having an inner edge and an outer edge with a length;
    the other component is an automatic transmission bowl component having an inner surface;
    further comprising:
    positioning the vanes with their outer edges adjacent the inner surface of the bowl; and
    applying the joining material along the outer edges of the vanes.

21. Method, according to claim 20, wherein:
    the bowl component is an impeller bowl.

22. Method, according to claim 20, wherein:
    the bowl component is a turbine bowl.

23. Method, according to claim 20, further comprising:
joining the inner edges of the vanes to a shroud.

24. Method, according to claim 20, wherein:
at least one vane is formed as a hollow member.

25. Method, according to claim 20, wherein:
the other component is an automatic transmission impeller bowl;
further comprising:
providing an automatic transmission turbine bowl disposed opposing the impeller bowl and a second plurality of vanes secured to the turbine bowl;
disposing a stator between the impeller bowl and the turbine bowl, between the first plurality of vanes and the second plurality of vanes, and extending radially to at least a radial midpoint of the vanes.

26. Method, according to claim 25, further comprising:
disposing an annular ring on a peripheral edge of the stator for the purpose of supplanting a torus ring attached to the first plurality of vanes.

27. Method, according to claim 25, further comprising:
providing a flat disc-like extension extending radially from a peripheral edge of the stator.

28. Method, according to claim 20, wherein:
the joining material is in the form of a multi-layer tape, a first layer of the tape comprising aluminum, and a second layer of the tape comprising an oxidizing agent.

29. Method of joining components together, comprising:
positioning one component adjacent another component;
applying a joining material to at least one junction between the one component and the other component; and
directing an energy source at the joining material;
wherein:
the joining material contains the following weight percentages of the following materials having the following particle sizes: 2% Cerium (<1 $\mu$m); 3% Boron (<1 $\mu$m); 5% Chromium (<1 $\mu$m) ; 12% Nickel (<1 $\mu$m) ; 18% Magnesium (<1 $\mu$m) ; 15% Aluminum (nanoscale); 2% Tin (1–3 $\mu$m); 5% Zinc (1–3 $\mu$m); 20% Copper (1–3 $\mu$m); and 18% Silver (1–3 $\mu$m).

30. Method of joining vanes to the bowl of an automatic transmission impeller assembly, comprising:
positioning a vane adjacent a bowl of an automatic transmission impeller assembly;
applying a self-sustaining joining material containing a metal having particulate sizes of between 1–3 $\mu$m to a junction between the vane and the bowl; and
directing a beam from an Nd:YAG laser at the joining material to raise the temperature of the joining material to a point no more than between and including about 200 and 400 degrees centigrade.

31. Method, according to claim 30, wherein:
the laser has a 200 W (Watt) output, emitting pulses of 0.5 ms (millisecond) duration at a frequency of 260 Hz (Hertz), with a beam diameter of approximately 1.5 mm (millimeters).

32. Method, according to claim 30, wherein:
the laser has a 500 W (Watt) output, emitting pulses of 1.0 ms (millisecond) duration at a frequency of 260 Hz (Hertz), with a beam diameter of approximately 1.5 mm (millimeters).

33. Method of joining components together comprising:
positioning one component adjacent another component;
applying a self-sustaining exothermic joining material to at least one junction between the one component and the other component;
directing an energy source at the self-sustaining exothermic joining material for elevating the temperatures of said joining material by no more than approximately 400° C. to initiate a continuous exothermic reaction along said junction between said one component and said other component for joining said components together; and
maintaining the temperature of said joining material at a level no more than approximately 400° C. throughout the process of joining the components together.

34. Method of joining components together comprising:
positioning one component adjacent another component;
applying a self-sustaining exothermic joining material to at least one junction between the one component and the other component, said self-sustaining exothermic joining material containing a first component including nanoscale size material smaller than approximately 100 nanometers and a second component including material having sizes of between 1–3 $\mu$m; and
directing an energy source at the self-sustaining exothermic joining material for elevating the temperature of said nanoscale material by no more than approximately 400° C. to initiate a continuous exothermic reaction along said junction between said one component and said other component for joining said components together.

35. Method of joining components together comprising:
positioning one component adjacent another component;
applying a self-sustaining exothermic joining material to at least one junction between the one component and the other component, said self-sustaining exothermic joining material containing nanoscale size material smaller than approximately 100 nanometers;
directing a laser beam at the self-sustaining exothermic joining material for elevating the temperature of said nanoscale material by no more than approximately 400° C. to initiate a continuous exothermic reaction in said self-sustaining exothermic joining material along said junction between said one component and said other component for joining said components together; and
maintaining the temperature of said joining material at a level no more than approximately 400° C. throughout the process of joining the components together.

36. Method of joining components together comprising:
positioning one component adjacent another component;
applying a self-sustaining exothermic joining material to at least one junction between the one component and the other component, said self-sustaining exothermic joining material containing nanoscale size material smaller than approximately 100 nanometers;
directing an infrared laser beam at the self-sustaining exothermic joining material for elevating the temperature of said nanoscale material by no more than approximately 400° C. to initiate a continuous exothermic reaction in said self-sustaining exothermic joining material along said junction between said one component and said other component for joining said components together; and
maintaining the temperature of said joining material at a level no more than approximately 400° C. throughout the process of joining the components together.

37. Method of joining components together, comprising:

positioning one component adjacent another component;

applying a joining material flowable at ambient temperatures to at least one junction between the one component and the other component, the joining material including a first part comprising nanoscale size particles of an exothermic material and a second part comprising copper having particulate sizes of between 1–3 $\mu$m; and directing an energy source at the joining material to raise the temperature of the joining material to a point no more than between and including about 200 and 400 degrees centigrade.

* * * * *